(12) United States Patent
Mindru et al.

(10) Patent No.: US 9,474,016 B2
(45) Date of Patent: Oct. 18, 2016

(54) CELL SEARCH IN A WIRELESS COMMUNICATION NETWORK

(71) Applicants: Ciprian Iancu Mindru, Harghita (RO); Tudor Bogatu, Bucharest (RO); Lucian Panduru, Rosu (RO); Balasubramanian Vaidhyanathan, Houston, TX (US)

(72) Inventors: Ciprian Iancu Mindru, Harghita (RO); Tudor Bogatu, Bucharest (RO); Lucian Panduru, Rosu (RO); Balasubramanian Vaidhyanathan, Houston, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 70 days.

(21) Appl. No.: 14/685,752

(22) Filed: Apr. 14, 2015

(65) Prior Publication Data
US 2016/0242103 A1   Aug. 18, 2016

(30) Foreign Application Priority Data

Feb. 13, 2015   (RO) .................................. 2015 00102

(51) Int. Cl.
| | |
|---|---|
| *H04J 3/06* | (2006.01) |
| *H04W 48/16* | (2009.01) |
| *H04J 11/00* | (2006.01) |
| *H04L 27/26* | (2006.01) |
| *H04W 56/00* | (2009.01) |

(52) U.S. Cl.
CPC .......... *H04W 48/16* (2013.01); *H04J 11/0079* (2013.01); *H04J 11/0093* (2013.01); *H04L 27/2663* (2013.01); *H04L 27/2665* (2013.01); *H04L 27/2675* (2013.01); *H04W 56/003* (2013.01)

(58) Field of Classification Search
None
See application file for complete search history.

(56) References Cited

U.S. PATENT DOCUMENTS

| | | | |
|---|---|---|---|
| 6,891,792 B1 | 5/2005 | Cimini, Jr. et al. |
| 7,558,245 B2 | 7/2009 | Laroia et al. |
| 2012/0140862 A1 | 6/2012 | Fine et al. |
| 2015/0365882 A1 | 12/2015 | Yang et al. |

OTHER PUBLICATIONS

Abdo N. Gaber, Loay D. Khalaf, Ahmad M. Mustafa: "Synchronization and Cell Search Algorithms in 3GPP Long Term Evolution Systems (FDD mode)", WSEAS Transactions on Communications, Issue 2, vol. 11, Feb. 2012; 12 pages.
Extended European Search Report dated Jul. 13, 2016 in EP Application No. 16155342.5.

*Primary Examiner* — Kibrom T Hailu

(57) ABSTRACT

The present application relates to an orthogonal frequency division multiplexing (OFDM) receiver and a method of operating the receiver for performing a cell search. A coarse correlator block is provided to detect one cell out of a by plurality of wireless communication cells by determining first correlation metric values by applying a partial correlation comprising part-wise correlating sample data with each one of a first set of phase-rotated reference sequences and non-coherent combining. The maximum of the first correlation values yields to a cell identifier value. A fine correlator block is provided to estimate a fine time offset value for the one wireless communication cell by determining second correlation values by applying a correlation comprising correlating the he sample data with each one of a second set of phase-rotated reference sequences. The maximum of the second correlation values value yields to a fine time offset.

20 Claims, 8 Drawing Sheets

CELL SEARCH IN A WIRELESS COMMUNICATION NETWORK

CROSS REFERENCE TO RELATED APPLICATION(S)

The present application claims priority to Romanian Patent Application No. RO A 2015 00102, entitled "CELL SEARCH IN A WIRELESS COMMUNICATION NETWORK," filed on Feb. 13, 2015, the entirety of which is herein incorporated by reference.

FIELD OF THE INVENTION

The present disclosure relates generally to wireless communication and more specifically to techniques for receiving control information in a wireless communication network.

BACKGROUND

Quality and capacity of wireless cellular telecommunication networks requires a proper coverage of geographical areas with radio signals, which are provided through base stations. The operating parameters of a base station, such as operating frequency, antenna orientation, transmission intensity and so forth, are essential for access to the wireless services and have to be established in an initial planning procedures, which may include the consideration of as many as few hundred base stations for a metropolitan area. The planning procedure is used to estimate interference between base stations, which affects the performance of the radio network, in view of a target overall capacity for the wireless services.

In response to the continuously increasing demand for wireless network capacity, distributed small base station entities, have been considered, which have been defined as metro, nano, pico and femto base stations with a smaller radio coverage in comparison to macro base stations. In order to enable the addition of further base stations into an established network, self-organizing capability has been introduced, which allows for automatic configuration of the operating parameters of base stations. For proper operation of the self-organization, a robust and reliable procedure to detect multiple base stations arranged in a neighborhood of a base station with self-organizing capability is desired, in particular for the case that the base stations in the detection area are not time-synchronized.

SUMMARY

The present invention provides an orthogonal frequency division multiplexing (OFDM) receiver, a method of operation an orthogonal frequency division multiplexing (OFDM) receiver and a non-transitory, tangible computer readable storage medium bearing computer executable instructions for operating an orthogonal frequency division multiplexing (OFDM) receiver as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
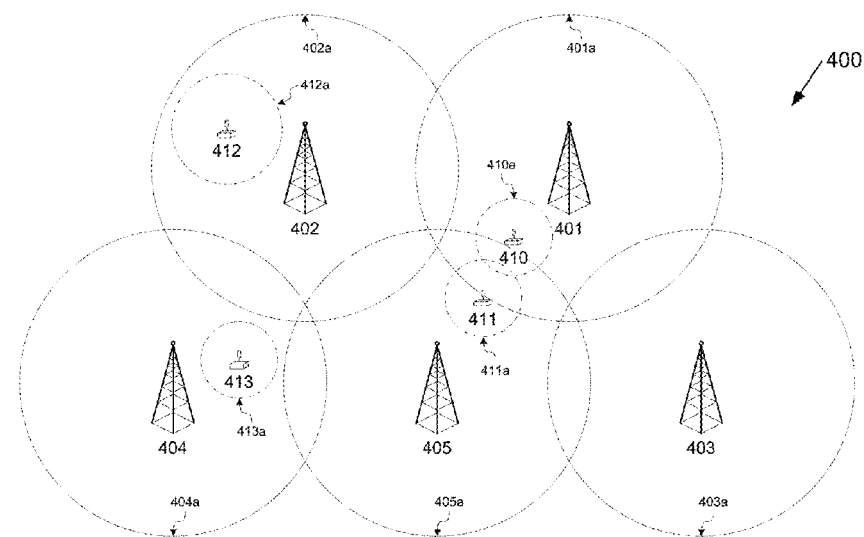
FIG. 1 schematically illustrates a block diagram of a cellular communication network including macro base stations and smart base stations.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The techniques described herein may be used for various wireless communication networks. In particular, the techniques described herein may be used in multicarrier communication networks such as OFDMA (Orthogonal Frequency-Division Multiple Access) networks, SC-FDMA (Single-Carrier Frequency-Division Multiple Access) networks and other networks. The terms "network" and "system" are often used interchangeably. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). UMB is described in documents from an organization named "3rd Generation Partnership Project 2" (3GPP2). The techniques may also be used for OFDM-based broadcast technologies such as Digital Video Broadcasting for Handhelds (DVB-H) and the like. The techniques described herein may be used for the wireless networks and radio technologies mentioned above as well as other wireless networks and radio technologies. For clarity, certain aspects of the techniques are described below for LTE, and LTE terminology is used in much of the description below but the invention should not be understood to be limited thereto.

Generally, cellular/mobile multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Cellular/mobile communication systems oftentimes employ one or more base stations or nodes that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

The current generation of cellular networks, such as LTE cellular networks and LTE-Advanced (LTE-A) cellular networks, are typically developed and initially deployed as homogeneous networks using a macro-centric planning process. A homogeneous cellular system is a network of macro bases stations in a planned layout and a collection of user terminals, in which all the macro base stations have similar transmit power levels, antenna patterns, receiver noise floors, and similar backhaul connectivity to the packet core network. The current generation of cellular networks allow for improving the spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In the following, the class of the so-called pico and femto base stations will be referred to as smart cell, which should be understood in general as a class of base stations implementing functionality for supporting heterogeneous network architecture. In a heterogeneous network, smarter resource coordination among base stations, better base station selection strategies and more advance techniques for efficient interference management may provide substantial gains in throughput and user experience as compared to a conventional homogeneous network architecture.

In heterogeneous networks, cell discovery is important to ensure efficient offload from macro cells to small cells. As aforementioned, a small cell may include a pico cell, a femto cell, or even a micro cell. In particular, a robust and reliable cell search is required in order to take advantages of the improved spectrum efficiency because otherwise the necessary interference management fails resulting in a significant drop of the spectrum efficiency due to interference.

Referencing to FIG. 1 shows a wireless communication network 400, which may be an LTE cellular network. The cellular network 400 may include a number of evolved NodeBs (eNodeBs) 401 to 405 and 411 to 413 and other network entities (not shown). An eNodeB may be a station that communicates with the cellular devices (UEs) and may be referred to as a base station, an access point, etc. also. A NodeB is another example of a station that communicates with the UEs.

Each eNodeB 401 to 405 and 411 to 413 may provide communication coverage for a particular geographic area. In 3GPP, the term "cell" can refer to a coverage area of a NodeB/eNodeB and/or an NodeB/eNodeB subsystem serving this coverage area, depending on the context in which the term is used. An eNodeB may provide communication coverage for a macro cell, a metro cell, a nano cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In general, the designations of the cells/(e)NodeBs indicate and relate to a measure of the coverage area thereof and the number of simultaneously served UEs.

In the example shown in FIG. 1, the eNodeBs 401 to 405 may be macro eNodeBs for the macro cells 401a to 405a. The eNodeB 413 may be a pico eNodeB for a pico cell 413a. The eNodeBs 410 and 411 may be femto eNodeBs for the femto cells 410a and 411a. The eNodeB 412 may be metro eNodeBs for the metro cell 412a. An eNodeB may support one or multiple (e.g., three) cells.

The cellular network 400 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be referred to as a relay eNodeB, a relay, etc.

The cellular network 400 may be a heterogeneous network that includes eNodeBs of different types, e.g., macro eNodeBs, a metro cell, nano cell, pico eNodeBs, femto eNodeBs, relays, etc. These different types of eNodeBs may have different transmit power levels, different coverage areas, and different impact on interference in the cellular network 400. For example, macro eNodeBs and metro eNodeBs may have a high transmit power level (e.g., 5 W-40 W) whereas pico eNodeBs, femto eNodeBs and relays may have a lower transmit power level (e.g., 100 mW-200 mW).

The cellular network 400 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time.

A network controller may couple to a set of eNodeBs and provide coordination and control for these eNodeBs. The network controller may communicate with the eNodeBs 401 to 405 via a backhaul. The eNodeBs may also communicate with one another, e.g., directly or indirectly via wireless or wireline backhaul.

The UEs may be dispersed throughout the wireless network 400, and each UE may be stationary or mobile. A UE may also be referred to as a terminal, a mobile station, a cellular station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc.

LTE/LTE-A takes advantage of OFDMA (Orthogonal Frequency Division Multiple Access), a multi-carrier scheme that allocates radio resources to multiple users. OFDMA uses Orthogonal Frequency Division Multiplexing (OFDM) on the downlink and single-carrier frequency division multiplexing (SC-FDM) on the uplink, which may be understood as a pre-coded version of OFDM. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for system bandwidth of 1.25, 2.5, 5, 10 or 20 MHz, respectively.

Figure 2A:
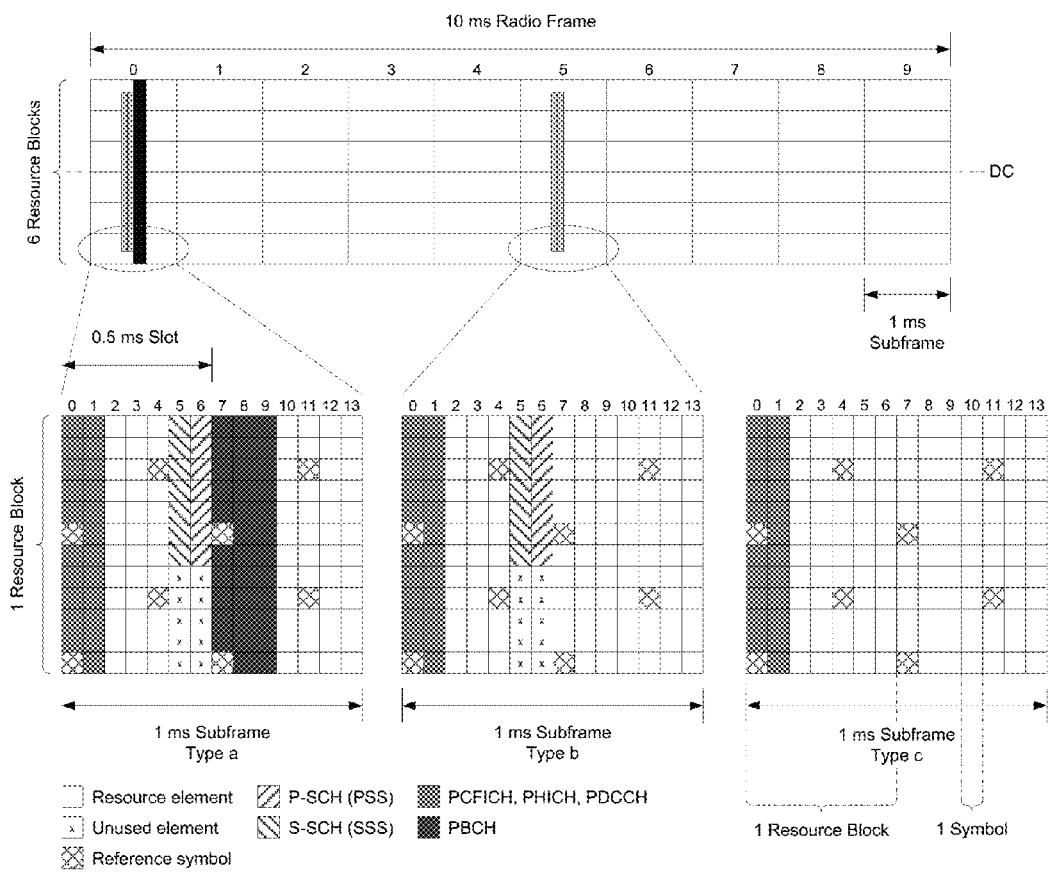
FIG. 2a schematically illustrates a block diagram of a frame structure used in FDD of an OFDM signal on a downlink channel.

Referring now to FIG. 2a, a downlink frame structure used in FDD mode of LTE/LTE-A is exemplarily illustrated. The transmission timeline for the downlink may be partitioned into units of radio frames. Each radio frame may have a predetermined duration (e.g., 10 milliseconds (ms)) and may be partitioned into two half-frames and 10 sub-frames. Each half-frame has a predetermined duration (e.g., 5 milliseconds (ms)). The 10 sub-frames as indexed with indices of 0 through 9 each having a predetermined duration (e.g., 1 milliseconds (ms)). The sub-frames 0 to 4 are associated with the first half-frame and the sub-frames 5 to 9 are associated with the second half-frame. Each sub-frame may include two slots. Each radio frame may thus include 20 slots, which may be indexed with indices of 0 through 19. Each slot may include L symbol periods, e.g., 7 symbol periods for a normal cyclic prefix (as shown in FIG. 2a) or 6 symbol periods for an extended cyclic prefix (not shown). The 2L symbol periods in each sub-frame may be assigned indices of 0 through 2L−1 (normal CP: 0 through 13 and extended CP: 0 to 11, respectively). The available time frequency resources may be partitioned into resource blocks. Each resource block may cover N subcarriers (e.g., 12 subcarriers as exemplified in FIG. 2a) in one slot.

In LTE/LTE-A FDD, an eNodeB sends a primary synchronization signal (PSS) and a secondary synchronization signal (SSS) for each cell in the eNodeB. The primary and secondary synchronization signals are sent in symbol periods 6 and 5, respectively, in each of sub-frames 0 and 5 of each radio frame with the normal cyclic prefix. As shown in FIG. 2a, the sub-frame 0 is referred to a sub-frame type a and the sub-frame 5 is referred to as sub-frame type b The remaining sub-frames 1 to 4 and 6 to 9 are in general structured in accordance with sub frame type c. The synchronization signals may be used for cell detection and acquisition. The various signals and channels in LTE are described in 3GPP TS 36.211, entitled "Evolved Universal Terrestrial Radio Access (E-UTRA); Physical Channels and Modulation," which is publicly available.

Figure 2B:
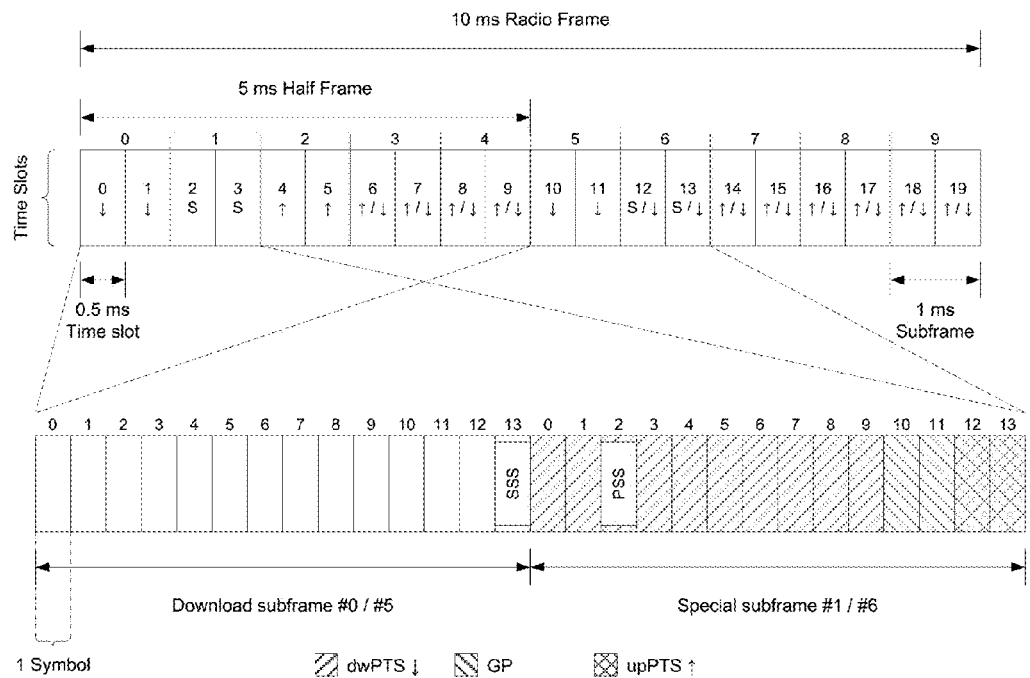
FIG. 2b schematically illustrates a block diagram of a TDD frame structure of an OFDM signal on a downlink channel.

Referring now to FIG. 2b, a downlink frame structure used in TDD mode of LTE/LTE-A is exemplarily illustrated. The transmission timeline for the downlink is partitioned into units of radio frames. Each radio frame has a predetermined duration of 10 milliseconds (ms) and is further partitioned into two 5 milliseconds (ms) half-frames. Each half-frame includes five sub-frames having a predetermined duration of 1 milliseconds (ms). The 10 sub-frames in the TDD radio frame are indexed with indices of 0 through 9, sub-frames 0 to 4 are associated with the first half-frame and the sub-frames 5 to 9 are associated with the second half-frame. Each sub-frame includes two time slots. Hence, each radio frame thus includes 20 slots, which may be indexed with indices of 0 through 19. Each slot may include L symbol periods, e.g., 7 symbol periods for a normal cyclic prefix (as shown in FIG. 2b) or 6 symbol periods for an extended cyclic prefix (not shown). The 2L symbol periods in each sub-frame may be assigned indices of 0 through 2L−1 (0 through 13).

LTE/LTE-A TDD uses the same frequency bands for the uplink and the downlink. The transmission directions are separated by carrying the uplink and downlink data in different sub-frames. The distribution of sub-frames between the transmission directions can be adapted to the data traffic and is done either symmetrically (equal number of uplink and downlink sub-frames) or asymmetrically. The following table shows the uplink-downlink configurations that are defined for LTE/LTE-A TDD. In this table, "DL" means that downlink data is transmitted in this sub-frame. Similarly, "UL" indicates uplink data transmission and "S" specifies special sub-frame.

| Uplink-downlink configuration | Downlink to uplink switch periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | DL | S | UL | UL | UL | DL | S | UL | UL | UL |
| 1 | 5 ms | DL | S | UL | UL | DL | DL | S | UL | UL | DL |
| 2 | 5 ms | DL | S | UL | DL | DL | DL | S | UL | DL | DL |
| 3 | 10 ms | DL | S | UL | UL | UL | DL | DL | DL | DL | DL |
| 4 | 10 ms | DL | S | UL | UL | DL | DL | DL | DL | DL | DL |
| 5 | 10 ms | DL | S | UL | DL | DL | DL | DL | DL | DL | DL |
| 6 | 5 ms | DL | S | UL | UL | UL | DL | S | UL | UL | DL |

The sub-frames 0 and 5 are always used for downlink data. The sub-frame that immediately follows the special fields always transmits uplink data.

The special sub-frame "S" comprises a Downlink Pilot Time Slot (dwPTS), Guard Period (GP) and Uplink Pilot Time Slot (upPTS). There are two such special sub-frames shown in the exemplarily illustrated radio frame of FIG. 2b. The GP field in the special sub-frame enables switching between downlink and uplink transmissions. Within a radio frame, LTE TDD switches multiple times between downlink and uplink transmission and vice versa. In the process, the different signal transit times between the base station and the various mobile stations must be taken into consideration in order to prevent conflicts with the neighboring sub-frame. The timing advance process prevents conflicts when switching from the uplink to the downlink. Every user equipment (UE) is informed by the base station (BS) as to when it must start transmitting. The greater the distance between the BS and the US, the earlier the US starts transmitting. This helps ensure that all signals reach the BS in a synchronized manner. When switching from the downlink to the uplink, a guard period (GP) is inserted between the Downlink Pilot Time Slot (DwPTS) and the UpPTS field. The duration of the Guard Period (GP) depends on the signal propagation time from the BS to the MS and back as well as on the time the UE requires to switch from receiving to sending. The duration of the Guard Period (GP) is configured by the network based on the cell size of the BS.

Hence, the symbol periods assigned to the Downlink Pilot Time Slot (DwPTS), Guard Period (GP) and Uplink Pilot Time Slot (UpPTS) are individually configurable in terms of length. The total length of all three fields corresponds to the predetermined duration of the sub-frame of 1 millisecond (ms). Nine different special sub-frame configurations are provided for LTE/LTE-A TDD as shown in following table.

| Special sub-frame configuration | Normal CP in OFDM Symbols | | | Extended CP in OFDM Symbols | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | — | — | — |
| 8 | 11 | 1 | 2 | — | — | — |

While the Guard Period (GP) separates between the uplink and the downlink, the other special fields are used for data transmission. The Downlink Pilot Time Slot (DwPTS) field carries Primary Synchronization Signal (PSS) and user data as well as the downlink control channel for transmitting scheduling and control information. The UpPTS field is used for transmitting the physical random access channel (PRACH) and the sounding reference signal (SRS). In particular, the Primary Synchronization Signal (PSS) is placed in the third OFDM symbol position of the Downlink Pilot Time Slot (DwPTS) field in the sub-frames 1 and 6 (cf. FIG. 2b and table relating to the "uplink-downlink configuration"), whereas the Secondary Synchronization Signal (SSS) is placed in the last OFDM symbol position of the sub-frame preceding sub-frame 0 and 5 (cf. FIG. 2b).

It should be noted that the same channels are defined for both LTE/LTE-A TDD and for LTE/LTE-A FDD. However, the positions of these channels within the radio frame are somewhat different for TDD and FDD. The various signals and channels in LTE are described in 3GPP TS 36.211, entitled "Evolved Universal Terrestrial Radio Access (E-UTRA); Physical Channels and Modulation," which is publicly available.

Figure 3:
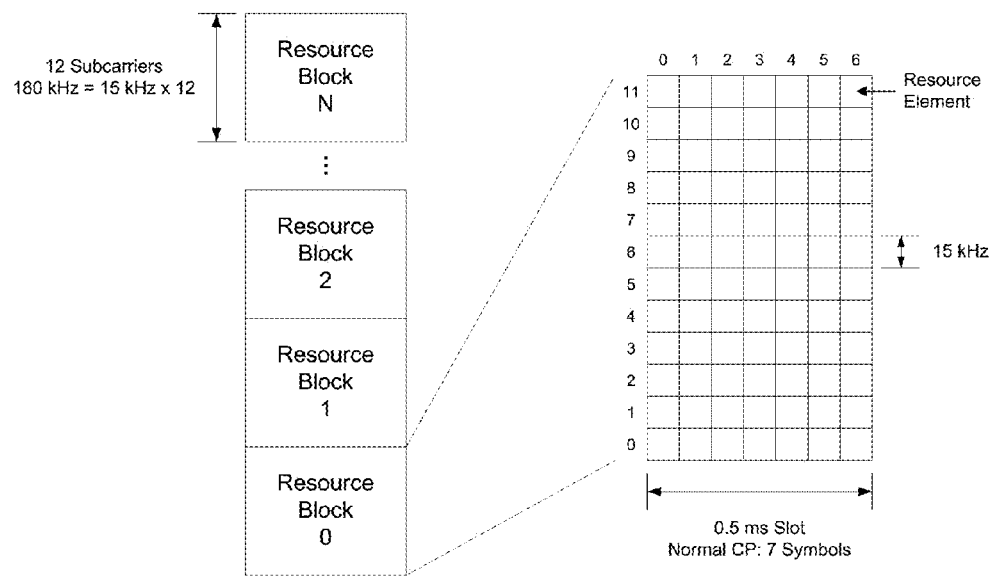
FIG. 3 schematically illustrates a block diagram of a slot structure of an OFDM signal on a downlink channel.

Referring now to FIG. 3, ten 1 ms sub-frames compose a 10 ms frame in LTE/LTE-A. Each sub-frames divides into two 0.5 ms slots. The smallest modulation structure in LTE/LTE-A is the Resource Element. A Resource Element is one 15 kHz subcarrier by one symbol. The Resource Elements aggregate into Resource Blocks. A Resource Block has dimensions of subcarriers by symbols. Twelve consecutive subcarriers in the frequency domain and six or seven symbols in the time domain form each Recourse Block. The number of symbols depends on the Cyclic Prefix (CP) in use. When a normal CP is used, the Resource Block contains seven symbols. When an extended CP is used, the Resource Block contains six symbols. A delay spread that exceeds the normal CP length indicates the use of extended CP.

Channel Bandwidth is the width of the channel as measured from the lowest channel edge to the highest channel edge. The channel edge is the center frequency±(channel bandwidth/2). Transmission Bandwidth is the number of active Resource Blocks in a transmission. As the bandwidth increases, the number of Resource Blocks increases. The Transmission Bandwidth Configuration is the maximum number of Resource Blocks for the particular Channel Bandwidth. The maximum occupied bandwidth is the number of Resource Blocks multiplied by 180 kHz.

Signals used in the cell search are the Primary Synchronization Signal (PSS) or Primary Synchronization Channel (P-SCH) and the Secondary Synchronization Signal (SSS) or Secondary Synchronization Channel (S-SCH). The Primary Synchronization Signal (PSS) and the Secondary Synchronization Signal (SSS) are pure downlink signal (P-SCH and S-SCH are pure downlink physical channels), which are broadcast over the entire cell by a base station. The PSS and SSS signals provide information about the physical layer ID, frame slot boundaries, frequency synchronization, group cell ID and radio frame timing. Time-frequency synchronization and physical layer cell ID (PCI) may be extracted from the PSS and SSS.

The synchronization channels are located at the centered frequency band, corresponding to 72 subcarriers, for all transmission bandwidth as shown e.g. in FIG. 2a. Among them, only 62 subcarriers carry the synchronization signals and 5 null guard subcarriers at both ends are reserved. In LTE/LTE-A systems, 504 different physical layer cell identifiers (PCI) are used for signaling. The different physical layer cell identifiers $N_{ID}^{cell}$ can be derived from a hierarchical scheme, which includes 168 different cell ID group values $N_{ID}^{(2)}$ and 3 different sector cell index values $N_{ID}^{(1)}$, where $$N_{ID}^{cell} = N_{ID}^{(2)} + N_{ID}^{(1)}.$$

Figure 4:
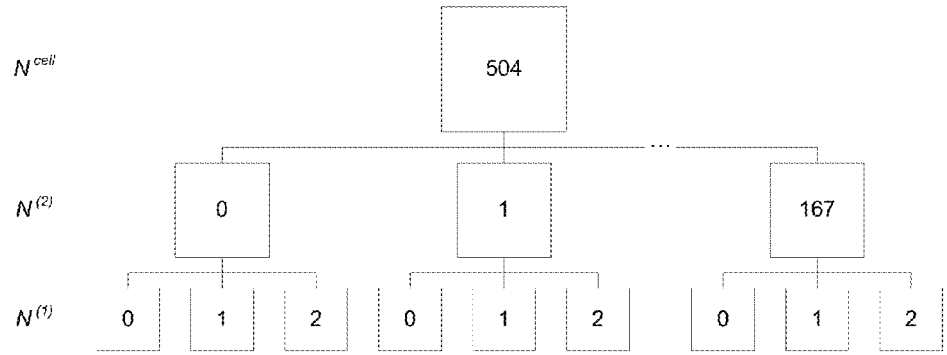
FIG. 4 schematically illustrates a block diagram of a hierarchical structure of physical layer cell identifiers.

The hierarchical scheme of the physical layer cell identifiers $N_{ID}^{cell}$ is schematically illustrated in FIG. 4. According to sector cell index $N_{ID}^{(2)}$, three different PSS sequence sets are generated by a frequency domain Zadoff-Chu sequence, which is given by $$d_u(n) = \begin{cases} e^{-j\frac{\pi u n(n+1)}{63}}, & n = 0, 1, \ldots, 30 \\ e^{-j\frac{\pi u(n+2)(n+1)}{63}}, & n = 31, 32, \ldots, 61 \end{cases}$$

Where the Zadoff-Chu root index u is 25, 29 and 34 for $N_{ID}^{(2)}=0,1,2$, respectively. The Zadoff-Chu sequence of length 62 is centered on the d.c. zero frequency index subcarrier to avoid d.c. injection.

Figure 5:
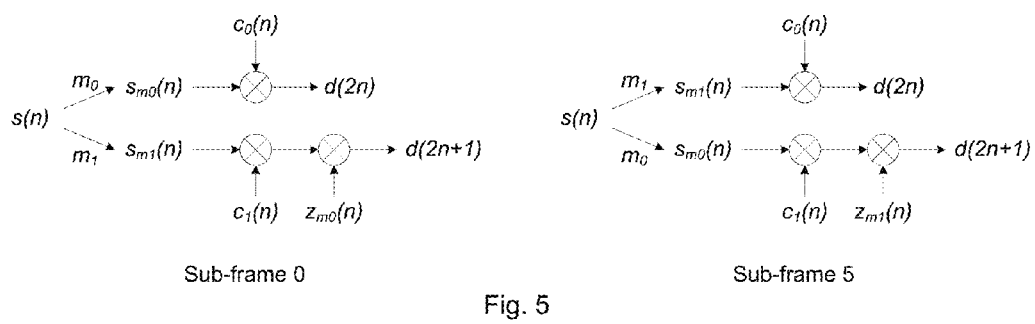
FIG. 5 schematically illustrates a block diagram of the generation of a secondary synchronization signal used in LTE.

Referring now to FIG. 5, a SSS sequence is generated by two 31-length pseudo-noise sequences (PN-sequence) $s_{m_i}(n)$ and $z_{m_i}(n)$, as well as one scrambling sequence $c_i(n)$ as follows $$d(2n) = \begin{cases} s_{m_0}(n) \cdot c_0(n), & \text{in sub-frame 0} \\ s_{m_1}(n) \cdot c_0(n), & \text{in sub-frame 5} \end{cases},$$

$$d(2n+1) = \begin{cases} s_{m_1}(n) \cdot c_1(n) \cdot z_{m_0}(n), & \text{in sub-frame 0} \\ s_{m_0}(n) \cdot c_1(n) \cdot z_{m_1}(n), & \text{in sub-frame 5} \end{cases}, n = 0, 1, 2, \ldots, 30$$

The SSS sequences of sub-frame 0 and sub-frame 5 differ from each other. The indices are derived from the cell ID group value $N_{ID}^{(1)}$ and the offset for the cyclic shift of the scrambling sequence $c_i(n)$ is based on the sector cell index value $N_{ID}^{(2)}$.

Then, the mapping of the synchronization signals to frequency domain data X(k) is given by $$\begin{cases} X(k) = d_u(n) \\ k = (n-31) + \left\lfloor \frac{n}{31} \right\rfloor \end{cases}$$

and $$\begin{cases} X(k) = d(n) \\ k = (n-31) \end{cases}, \text{respectively.}$$

OFDM based communication systems are sensitive to synchronization imperfection. The symbol timing synchronization error cause inter symbol interference (ISI) and the frequency synchronization error is one of the reasons for inter carrier interference (ICI). In OFDM, frequency synchronization errors are actually Carrier Frequency Offsets (CFO) and are generally caused by unmatched local oscillators at the two ends of the communication links, Doppler shifts or phase noise introduced by nonlinear channel. Timing alignment errors may occur in cases where the Fourier transform aperture contains part of the guard interval that has been distorted by inter symbol interference (ISI). Timing alignment errors are for instance caused by multipath propagation. In multipath propagation condition, the multiple propagation paths are of different lengths. This results in the different versions of the signal arriving at a receiver at different times. These delays mean that part or all of a given symbol may be spread into the subsequent symbols, thereby interfering with the correct detection of those symbols. Additionally, the various paths often distort the amplitude and/or phase of the signal thereby causing further interference with the received signal.

Inherent redundancy in the OFDM signal structure is used suppress adverse effects of symbol time offset STO. Each OFDM symbol is extended by a Cyclic Prefix (CP), which is a cyclic repetition of the tail end of the respective OFDM symbol. In addition, the cyclic prefix (CP), i.e. a cyclic extension added to each symbol before transmission, is used to ensure the circularity of the channel coupling matrix in time. The cyclic prefix does not convey payload data. Accordingly, if symbols overlap in time at the receiver, this can be tolerated as long as the cyclic prefix is affected only. The Cyclic Prefix (CP) ensures that the OFDM symbols remain orthogonal as long as time offsets of arrival do not exceed the duration of a Cyclic Prefix, CP. Otherwise, inter symbol interference (ISI) is experienced.

As already mentioned above, cell search allows a base station to discover further base stations, which are arranged in close relationship to the searching base station such that wireless communication signals are received from them, which requires a coordinated operation of the base stations because of the overlapping cell coverage areas. Generally, a receiver can be synchronized in time to only one transmitter at the same time.

This leads to time differences of symbols arriving at the cell searching base station, so-called time differences of arrival (TDOA), at least caused by different distances between the antennas of the transmitting base stations and the receiving base station and channel conditions along the propagation paths. These time differences, at least when discretized and with respect to the sampling interval, equal to the symbol timing offsets (STO).

Figure 6:
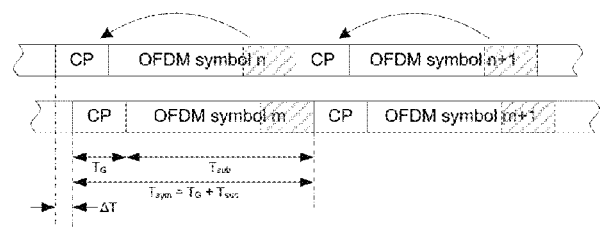
FIG. 6 schematically illustrates a block diagram of a structure of an OFDM signal on a downlink channel.

Referring now to FIG. 6, those skilled in the art will understand from the following description that the synchronization methodology suggested to be used in conjunction with cell search is scalable as long as the time offsets ΔT of the signal arrivals from the base stations to be discovered, is within the order of the length $T_G$ of the Cyclic Prefix (CP). The Inter Symbol Interference (ISI) is not significant as long as the time offsets of the signal arrivals from the base stations to be discovered, is within the order of the length of the Cyclic Prefix (CP). The difference in length between the cyclic prefix (CP) and the channel impulse response (CIR) is crucial. This difference is the part of the cyclic prefix that is not affected by the previous symbol due to the channel dispersion, as can be seen in FIG. 6. As long as a symbol time offset (STO) does not exceed this difference, a time offset within this interval only results in a phase rotation of the subcarrier constellations.

Figure 7:
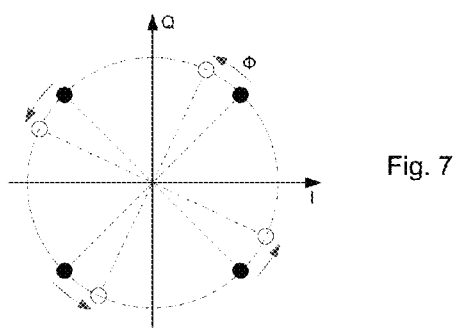
FIG. 7 schematically illustrates the effect of signal symbol distortion with respect to a time offset.

Referring now to FIG. 7, the data is modulated in blocks by means of a Fast Fourier transform (FFT) in OFDM based communication systems. Data stream is mapped into N complex symbols in frequency domain. These N complex symbols are modulated on N subcarriers by using N-point inverse fast Fourier transform (IFFT) and the time domain samples are computed using the well-known IFFT formula $$x(n) = \frac{1}{\sqrt{N}}\sum_{k=0}^{N-1} d_k(n)e^{\frac{j2\pi kn}{N}}, n = 0, 1, \ldots, N-1$$

Received signal can be modeled as $$r(n)=x(n-\theta)e^{j2\pi n\epsilon}+\omega(n)$$

Here θ represents a time offset, ϵ is a carrier frequency offset (CFO), ω(n) is complex additive white Gaussian noise and x(n) is transmitted signal. If cyclic prefix is greater than CIR duration (0 to L−1) then there is certain interval, which is not affected by previous symbol.

As long as the Fourier transform window starts anywhere in this interval, no Inter Symbol Interference (ISI) is present at the Fourier transform output. This situation occurs whenever the time offset θ belongs to interval $-N_g+L-1\leq\theta\leq 0$ and only results in a cyclic shift of the received OFDM block, wherein $N_g$ is the length of the cyclic prefix (CP) in number of samples. Fourier transform output over the $k^{th}$ subcarrier takes the from $$R(k) = e^{\frac{-j2\pi k\theta}{N}}H(k)d(k)+\omega(k),$$

wherein $$H(k) = \sum_{l=0}^{L-1} h(l)e^{\frac{-j2\pi kl}{N}}$$

and h(l) is the complex channel impulse and d represents the OFDM symbol. The equation of R(k) indicates that timing error θ appears as a linear phase across subcarriers as illustratively depicted in FIG. 7.

Figure 8:
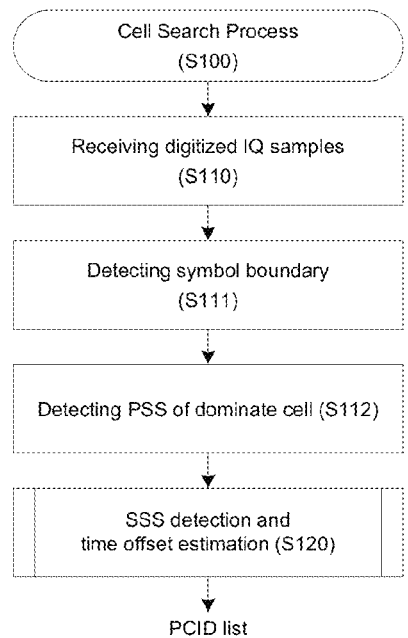
FIG. 8 schematically illustrates a flow diagram of a method for cell detection based on synchronization signals of multiple base stations according to an example of the present invention.

Referring now to FIG. 8, a flow diagram of a cell search procedure according to an example of the present disclosure is schematically illustrated. The exemplary cell search process illustrated in FIG. 8 and described with reference thereto in the following may be carried out by an ODFM receiver as exemplified with reference to FIGS. 12 and 15 described below in more detail.

At a base station, in particular a smart cell such as a metro, femto, or pico cell, which for instance supports an automatic self-organizing scheme, an RF signal is received from the neighboring cells/base stations. The received RF signal comprises the individual RF signals transmitted by the neighboring cells/base stations. The individual RF signals transmitted by the neighboring cells/base stations are not received synchronized in time, e.g. because of differing distances, signal propagation paths and/or channel conditions, which yield to differing signal propagation times. However, the transmitting neighboring cells/base stations should be considered to be at least substantially synchronized in time. Accordingly, the received RF signal is a superposition of the signals received from all cells/base stations in the surrounding.

In an operation S100, the cell detection procedure is initiated.

Digitized IQ sample data is received from an analog-to-digital converter (ADC) of the OFDM receiver in an operation S110.

In an operation S111, the presence of 7 or 6 consecutive symbols is detected in the digitized IQ sample data. The number of 6 or 7 consecutive symbols depend on whether normal cyclic prefix (CP) or extended cyclic prefix (CP) coding is used for the symbols of a slot as described above. Upon successful detection of 7 or 6 consecutive signal peaks in the IQ sample data received from the analog-to-digital converter (ADC) of the OFDM receiver, the detected peaks enable assigning indices to the digitized IQ sample data.

The symbol boundaries may be detected for instance using the CP structure of the downlink radio frame. The sample data may be shifted by 2048 samples (corresponding to the symbol length) and multiplied with the original sample data element-wise after being complex-conjugated. Then, a mean squared error (MSW) metric may be calculated over a sliding window of 144 samples (corresponding to the length of normal CP for all symbols expect the first one in case of FDD mode). The minimum values of the MSE metric over each non-overlapping segment of 2048 samples is assumed to be the starting sample of the cyclic prefix (CP) preceding each symbol. CP structure of the downlink radio frame may be also exploited for estimating the fractional frequency offset using the same principle as before: repetitive signal parts are identical up to a phase difference. Joint maximum-likelihood estimation of offsets in time and frequency yields a frequency-offset estimate.

It should be noted that detecting symbol boundaries and the determining frequency-offset estimates using the CP structure of the downlink frame is known in the art and out of the scope of the present invention.

In an operation S112, the Primary Synchronization Signal (PSS) is detected in the digitized IQ sample data based on indices assigned to the digitized IQ sample data. As described above, the Primary Synchronization Signal (PSS) is transmitted twice or once pre each 10 ms radio frame. Moreover, in LTE/LTE-A FDD mode, the Primary Synchronization Signal (PSS) transmitted twice each in each radio frame and is located in the last OFDM symbol of the first slot of the first sub-frame (time slot 0, sub-frame 0) and in the last OFDM symbol of the first time slot of the $6^{th}$ sub-frame (time slot 11, sub-frame 4) of each radio frame. In LTE/LTE-A TDD mode, the Primary Synchronization Signal (PSS) is transmitted twice per radio frame having a periodicity of 5 ms and once per radio frame having a periodicity of 10 ms, wherein the Primary Synchronization Signal (PSS) is located in the third time slot of the second (special) sub-frame (time slot 2, sub-frame 1) per radio frame with periodicity of 5 ms or 10 ms. The Primary Synchronization Signal (PSS) is located in the third time slot of the $7^{th}$ (special) sub-frame (time slot 2, sub-frame 6) per radio frame with periodicity of 5 ms.

The coarse symbol timing obtained from the symbol boundary detection is used as an initialization of the PSS detection. Each cell transmits the same Primary Synchronization Signal (PSS) at the respective locations of each radio frame. As aforementioned, the Primary Synchronization Signal (PSS) sequence is one of three Zadoff-Chu (ZC) sequences correspond to sector cell index value $N_{ID}^{(2)}=0,1,2$.

Three reference PSS sequences in time domain may be precomputed, transformed sequences in frequency domain of which correspond to the respective ZC sequence elements at the 62 subcarriers with zero values for the remaining subcarriers. The reference sequences in time domain may be computed by inverse Fourier transform of the three zero-padded Zadoff-Chu (ZC) sequences. The reference sequences may be correlated with blocks of e.g. 2048 samples. The positions of the blocks are determined on the basis of the symbol boundary detection. If the maximum value of the correlation within this interval is greater than a predefined threshold, then the corresponding OFDM symbol timing is noted and the corresponding symbol is assumed to contain the PSS corresponding to the maximizing reference sequence. The digitized IQ sample data comprises a superposition of the PSS sequences received from all cells/base stations in the surrounding.

Hence, the maximum value of the correlation determined as described above reveals the PSS of the cell/base station with the dominate PSS out of the transmitting cells/base stations in the surrounding. The position of the OFDM symbol, which comprises the PSS is known from the detection of the dominate PSS. It should be noted that detecting primary synchronization signal and determining frame timing using the detected PSS of a downlink frame is known in the art and out of the scope of the present invention.

Starting from the detection of the dominate PSS and the frame timing/position of the OFDM symbol comprising the PSS, the blocks of e.g. 2048 samples at the positions of the OFDM symbol comprising the SSS sequences of the cells/base stations in the surrounding are identifiable in the digitized IQ sample data in an operation S120.

In order to obtain a list of cells in the surrounding, at least a block of e.g. 2048 samples are provided to the SSS detection and time-offset estimation. The block of samples comprises at least the subcarriers used for coding the SSS. The block of samples comprises samples corresponding to the penultimate OFDM symbol in the first time slot of the first sub-frame (time slot 0, sub-frame 0) or in the 11$^{th}$ time slot of the 6$^{th}$ sub-frame (time slot 10, sub-frame 5) in case of LTE/LTE-A FDD, and the last OFDM symbol in the second time slot of the first sub-frame (time slot 1, sub-frame 0) or in the 12$^{th}$ time slot of the 6$^{th}$ sub-frame (time slot 11, sub-frame 5) in case of LTE/LTE-A TDD.

The operation of Secondary Synchronization Signals (SSS) detection and time offset estimation will be described in detail with reference to the flow diagram illustratively shown in FIG. 9.

Figure 9:
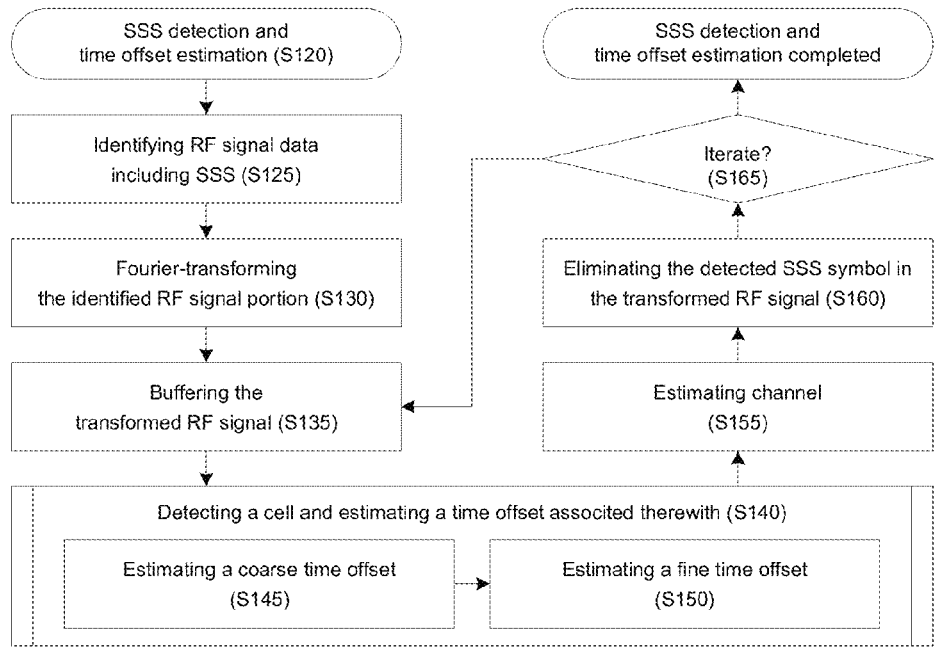
FIG. 9 schematically illustrates a flow diagram of a method for detecting second synchronization signals and time offsets according to an example of the present invention.

Referring now to FIG. 9, a flow diagram of a Secondary Synchronization Signals (SSS) detection and time offset estimation according to an example of the present disclosure is schematically illustrated.

Starting from the frame timing determined based on the detection of the Primary Synchronization Signal (PSS) sequence in the digitized IQ sample data obtained from the RF signal received from the cells/base stations in the surrounding environment, an extraction window is defined for extracting the sample data comprising the Secondary Synchronization Signals (SSS) symbol. The extraction window is defined with respect to the slot timing based on the detected Primary Synchronization Signal (PSS) sequence, which has a predefined time slot offset in relationship to the respective Secondary Synchronization Signals (SSS) symbol (the SSS symbol in the same half-frame) in the digitized IQ sample data. In accordance with the extraction window, a block of samples is identified in an operation S125, which comprises samples coding the OFDM symbol including the Secondary Synchronization Signal (SSS). The received RF signal is a superposition of the signals received from all cells/base stations in the surrounding. Hence, the identified block of samples comprises a superposition of the Secondary Synchronization Signals (SSS) sequences received from all cells/base stations in the surrounding. This means that sample data of the Second Synchronization Signal (SSS) symbol is extracted at a position in the digitized IQ sample data in defined relationship to the position of the detected PSS symbol.

The sample data of the extracted block are converted into the frequency domain. A Fourier transform, a Fast Fourier transform or a Discrete Fourier transform may be applied to the samples of the extracted block, in an operation S130. The transformed sample data comprises at least the 62 subcarriers, in which the Secondary Synchronization Signal (SSS) symbol is coded. In the following, the transformed sample data of the extracted block will be denoted $$R[k], k=31,\ldots,31/\{0\}$$

Possible modulation schemes used with OFDM include binary phase shift keying (BPSK), in which one bit is encoded to each subcarrier of the OFDM symbol, quadrature phase shift keying (QPSK), in which two bits are encoded to each subcarrier of the OFDM symbol, or even a quadrature amplitude modulation (QAM) scheme in which multiple bits are encoded to each subcarrier of the OFDM symbol.

The transformed sample data of the extracted block is stored in a buffer, in an operation S135. The SSS detection and time offset estimation procedure is performed based on the buffered data.

Using the transformed sample data of the extracted block obtained from stream of sample data generated by the receiver a cell detection and time offset estimation procedure is performed, which yields the physical layer cell identifiers $N_{ID}^{cell}$ of one cell/base station out of the surrounding cells/base stations and a time offset associated with the identified cell/base station, in an operation S140. The cell detection and time offset estimation procedure comprises a coarse time offset estimation procedure, which yields to detection of an SSS sequence of one cell/base station, which SSS sequence is comprises in the transformed sample data of the extracted block the transformed sample data of the extracted block initially comprises the SSS sequences of the cells/base stations in the surrounding and a fine time offset estimation procedure for the detected cell/base station.

A channel estimation is performed in an operation S155. The cell detection and time offset estimation procedure yields to the physical layer cell identifier $N_{ID}^{cell}$ of a detected cell/base station and a fine time offset associated therewith. Accordingly, the cell detection and time offset estimation procedure allows for regenerating the Secondary Synchronization Signal (SSS) sequence originally transmitted by the detected cell/base station and having a time delay $\Delta t$ corresponding to the associated fine time offset value experienced at the receiver. In the following, the regenerated Secondary Synchronization Signal (SSS) sequence is $$S^{(\Delta t)}[k], k=31,\ldots,31/\{0\}.$$

Assuming a flat channel for the 63 subcarriers; the coherence bandwidth of the channel is larger than the bandwidth of the signal, therefore, all frequency components of the signal will experience the same magnitude of fading; channel frequency response estimate is given by $$\hat{H}[k] = \hat{H} = \frac{\Sigma R[k] \cdot S^{(\Delta t)}[k]^*}{\Sigma S^{(\Delta t)}[k] \cdot S^{(\Delta t)}[k]^*}$$

On the basis of the channel frequency response estimate and the regenerated Secondary Synchronization Signal (SSS) sequence of the detected cell/base station as received the interference is modeled.

Since neighboring cells/base stations are at least close to being time and frequency synchronized, the time-frequency resources overlap for neighbor cells/base stations. A Successive Interference Cancellation (SIC) is applicable for code separation for the different cells/base stations in the surrounding of the receiver. A Signal Interference Cancellation (SIC) procedure is applied in an operation S160 using the regenerated Secondary Synchronization Signal (SSS) sequence $S^{(\Delta t)}[k]\hat{H}[k]$ to eliminate substantially the contribution of the Secondary Synchronization Signal (SSS) received from the detected cell/base station from the transformed sample data of the extracted block stored in the buffer.

The detection of a cell/base station and estimating a fine time offset associated therewith, the estimation of the channel frequency response on the basis of a regenerated Secondary Synchronization Signal (SSS) received from the detected cell/base station and the cancelling of the contribution of the Secondary Synchronization Signal (SSS) received from the detected cell/base station to the transformed sample data of the extracted block stored in the buffer is iterated to detect further cells/base stations in the surrounding of the receiver on the basis of the residual transformed sample data remaining after the Signal Interference Cancellation (SIC) procedure.

As already mentioned above, the buffered transformed sample data includes superposed Secondary Synchronization Signal (SSS) sequences received from neighboring cells/base stations. The estimation of a fine time offset for the detected cell/base station enables to eliminate, at least substantially, the signal contribution thereof to the buffered transformed sample data.

The procedures are iterated in a loop until a iteration stop criteria is met in an operation S165, for instance until a predetermined number of cells/base stations has been detected, it is considered to be unlikely to detect further cells/base stations from the residual transformed sample data and the like.

Once the cell detection and time offset estimation procedure is completed, the physical layer cell identifiers $N_{ID}^{cell}$ each associated with a fine time offset value $\Delta t_{fine}$ for each detected cell/base station in the surrounding is neighboring cell/base station is available at the receiver. The physical layer cell identifiers $N_{ID}^{cell}$ and associated fine time offset values $\Delta t_{fine}$ may be provided in a list for further processing at the receiver.

The cell detection and time offset estimation procedure comprises a two-stage procedure to estimate the time offset including a coarse time offset estimation procedure, in an operation S145, which will be described below in more detail with reference to FIG. 10, and a fine time offset estimation procedure, in an operation S150, which will be described below in more detail with reference to FIG. 11.

The two-stage procedure of estimating a time offset allows for an improved detection performance of multiple cells and allows to determine individual time offset estimation for the cells/base stations in the surrounding through frequency domain correlation of the Secondary Synchronization Signal (SSS) sequences with reference sequences.

Figures 10, 11:
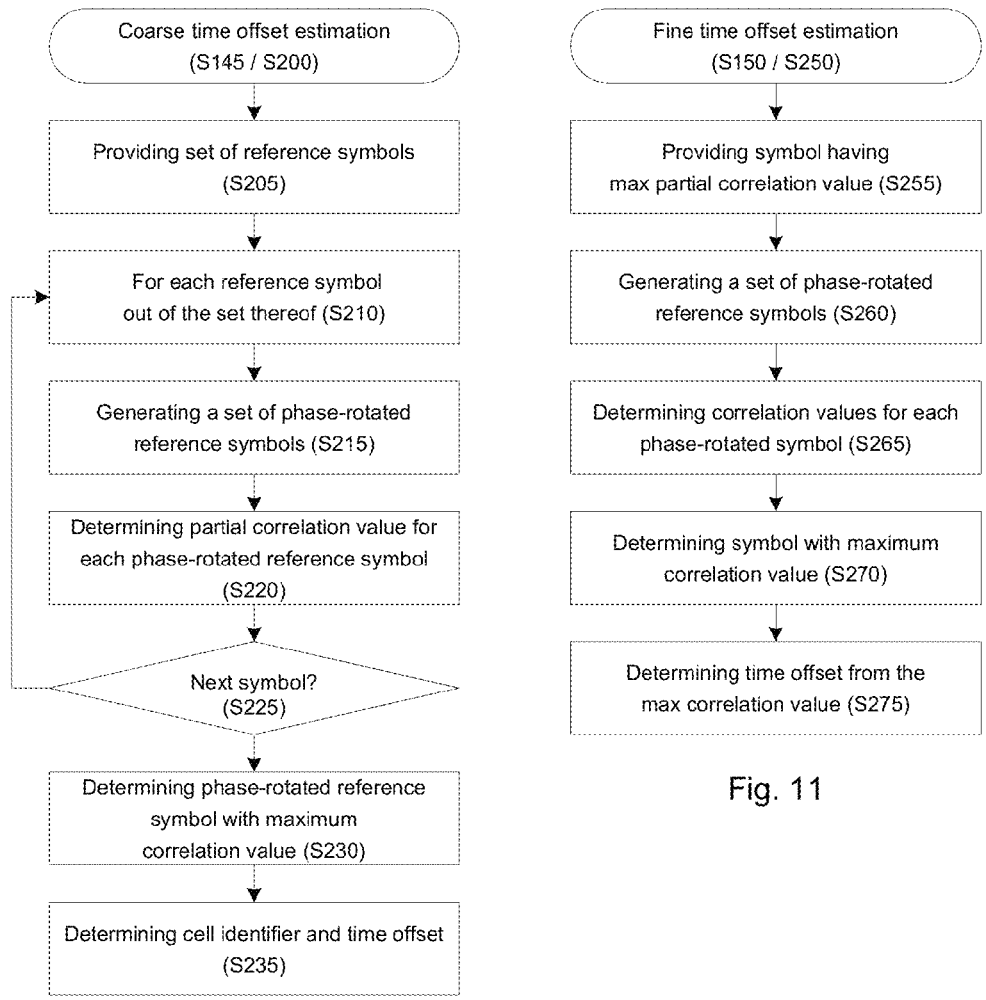
FIG. 10 schematically illustrates a flow diagram of a method of synchronization signals and coarse time offset estimation according to an example of the present invention.
FIG. 11 schematically illustrates a flow diagram of a method of fine time offset estimation according to an example of the present invention.

Referring now to FIG. 10, the coarse offset time estimation (cf. operation S145 of FIG. 9 and S200 of FIG. 10, respectively), which represents the first stage, is further detailed with respect to an embodiment of the present application. Input values to the coarse offset time estimation are the buffered transformed sample data R[k], a set of reference sequences $S_j[k]$ corresponding to the possible Secondary Synchronization Signals (SSS) in the buffered transformed sample data and a set $C_{coarse}$ of time offset candidates.

As aforementioned, each Secondary Synchronization Signal (SSS) received from one of the neighboring cells/base stations corresponds to one out of a set of 504 possible different secondary synchronization reference symbols, which are derivable according to 168 different cell ID group values $N_{ID}^{(2)}$ and 3 different sector cell index values $N_{ID}^{(1)}$. The Secondary Synchronization Signal (SSS) sequences received from different neighboring cells/base stations differ from each other. Each received Secondary Synchronization Signal (SSS) may be shifted in time by an individual time offset value due to individual distance and/or propagation path and channel conditions for each cell/base station in the surrounding.

In order to identify one of the Secondary Synchronization Signal (SSS) symbols, which is received from one of the neighboring cells/base stations, a complete set of $N_{ref}$ reference sequences is provided, which corresponds to the set of possible reference sequences, cf. operation S205. The reference sequences may be pre-calculated and provided to be retrieved from a storage or the reference sequences may be generated on request. The reference sequences should be denoted as $S_j[k], j=0, \ldots, N_{ref}-1 \wedge k=31 \ldots 31/\{0\}$.

A set of $N_{coarse}$ phase-rotated reference sequences is generated from each reference sequence $S_j[k]$, cf. operations S210 and S215. The rotation angles in phase of the reference sequences $S_j[k]$ model Secondary Synchronization Signal (SSS) symbols received from a cell/base station at the receiver at different time offsets $\Delta t_{coarse}$. For instance, $N_{coarse}=5$ different phase-rotated reference sequences may be generated from each reference sequence $S_j[k]$. The time offsets $\Delta t_{coarse}$ may be predefined, for instance set of $N_{coarse}$ time offsets $\Delta t_{coarse}$ may comprise following values $$\Delta t_{coarse} = \left\{ -T_g, -\frac{T_g}{2}, 0, \frac{T_g}{2}, T_g \right\},$$

wherein $T_g$ represents the guard interval served by the Cyclic Prefix (CP). The extended symbol duration $T_s=T_g+T$, where T represents the symbol duration. It should be noted that the above set of time offsets $\Delta t_{coarse}$ spans the time interval $(-T_g, T_g)$ with a resolution of $T_g/2$. The resolution and span may be adjusted depending on processing capabilities and constraints. The time offsets $\Delta t_{coarse}$ may be defined as normalized time offsets $\Delta n_{coarse}$ with respect to the sampling period $T_{Sample}$:

$$\Delta n_{coarse} = \frac{1}{T_{Sample}} \left\{ -T_g, -\frac{T_g}{2}, 0, \frac{T_g}{2}, T_g \right\}.$$

Accordingly, a set of $N_{coarse} \cdot N_{ref}$ phase-rotated reference sequences $S_j^{(n_0)}[k]$ is generated $$S_j^{(n_0)}[k] = S_j[k] \cdot \exp\left(-j2\pi \frac{kn_0}{N}\right),$$

where $n_0 \in C_{coarse} \wedge C_{coarse} := C_{coarse}(\Delta t_{coarse})$ represents the set of rotation phase candidates in number of samples.

In an operation S220, each phase-rotated reference sequence $S_j^{(n_0)}[k]$ of the set thereof is partially correlated in frequency domain with the transformed sample data R[k] of the extracted block retrievable from the buffer. The partial correlation may be computed by part-wise correlating the transformed sample data R[k] with each phase-rotated reference sequence $S_j^{(n_0)}[k]$ and non-coherent combining the correlation metric values of the parts for each reference sequence $S_j^{(n_0)}[k]$. The partial correlation may comprise a correlation of a first part of the transformed sample data R[k] with the respective first part of each phase-rotated reference sequence $S_j^{(n_0)}[k]$ and a correlation of a second part of the transformed sample data R[k] with the respective second part of the each phase-rotated reference sequence $S_j^{(n_0)}[k]$, wherein the partial correlation are combined non-coherently. For instance, the partial correlation may be computed as following:

$$r_c[j, n_0] = \left|\sum_{k=-31}^{k=-1} R[k] \cdot S_j^{(n_0)}[k]^*\right|^2 + \left|\sum_{k=1}^{k=31} R[k] \cdot S_j^{(n_0)}[k]^*\right|^2$$

The correlation metric $r_c[j,n_0]$ comprises two partial correlations each with a length of 31 subcarriers, which are combined non-coherently.

A correlation metric value $r_c[j,n_0]$ for each phase-rotated reference sequence with the transformed sample data R[k] is determined. Each phase-rotated reference sequence corresponds to one Secondary Synchronization Signal (SSS) symbol out of the set of all possible Secondary Synchronization Signal symbols with a rotation in phase corresponding to a time offset. Hence, the correlation metric values are functions of two variables: the reference symbol $S_{j\_max}[k]$ and the rotation phase $n_{0\_max}$ corresponding to a physical layer cell identifier value $N_{ID}^{cell} = N_{ID}^{(j\_max)}$ and a time offset value $$\Delta t_{coarse}^{(n_{0\_max})} = \Delta t_{CTOE},$$

respectively.

The maximum value $r_c[j\_max, n_{0\_max}]$ of the $N_{coarse} \cdot N_{ref}$ correlation matric values $r_c[j,n_0]$ is determined; cf. operation S230.

$$\underset{j,n_0}{\mathrm{argmax}}\, r_c[j, n_0] = \{N_{ID}^{cell}, \Delta t_{CTOE}\} \mid_{\substack{j\_max \\ n_{0\_max}}}$$

The maximum value $r_c[j\_max, n_{0\_max}]$ yields a reference sequence $$S_{j\_max}^{(n_{0\_max})}[k]$$

corresponding to the cell identifier value $N_{ID}^{cell} = N_{ID}^{(j\_max)}$ rotated by a rotation phase candidate value $n_{0\_max}$ corresponding to the coarse time offset $\Delta t_{CTOE}$. Accordingly, a physical layer cell identifier value $N_{ID}^{cell}$ and an associated coarse time offset value $\Delta t_{CTOE}$ of one cell/base station of the surrounding cells/base stations, which contributes to the transformed sample data R[k] of the extracted block retrievable from the buffer, is obtainable from the correlation metric $r_c[j,n_0]$; cf. operation S235.

In summary, the coarse time offset estimation involves correlating the buffered transformed sample data comprising the Secondary Synchronization Signals (SSS), which are received from the neighboring cells/base stations, with the reference symbols in frequency domain rotated in phase. The maximum value of the correlation metric yields a cell identifier value and a coarse time offset estimate value of a detected cell/base station out of the surrounding cells/base stations. This stage uses partial correlation each with a length of 31 subcarriers to ensure detection robustness against time offsets.

As understood from the above description, it is initially unknown whether the transformed sample data R[k] of the extracted block is extracted from the first half-frame or the second half-frame of the radio frame. The Secondary Synchronization Signal (SSS) sequences of the first half-frame or the second half-frame differ from each other.

Upon performing the coarse offset time estimation the first time, the set of reference sequences may comprise the set of reference sequences of the first half-frame and the set of reference sequences of the second half-frame resulting to a set of $N_{ref} = 2 \cdot 504$ reference sequences. The maximum value of the $N_{coarse} \cdot N_{ref}$ correlation matric values $r_c[j,n_0]$ also yields to the sub-frame number, at which the block of the transformed sample data has been extracted from the sample stream of the received RF signal since the mode (LTE/LTE-A FDD of TDD mode and the frame structure thereof) is known.

At each further iteration step, the sub-frame number is known. Hence, the set of reference sequences may comprise set of $N_{ref} = 504$ reference sequences corresponding to the sub-frame number.

As further understood from the above description, transformed sample data R[k] represents the residual transformed sample data R[k] comprising Secondary Synchronization Signals (SSS) received from the neighboring cells/base stations, which have been not detected yet. The contribution of Secondary Synchronization Signal (SSS) of detected cells/base stations are cancelled from the transformed sample data R[k] after detection at each iteration of the cell detection and time offset estimation procedure.

Referring now to FIG. 11, the fine offset time estimation (cf. operation S150 of FIG. 9 and S250 of FIG. 11, respectively), which represents the second stage, is further detailed with respect to an example of the present application. Input values to the fine time offset estimation are the buffered transformed sample data R[k], the cell identifier value $N_{ID}^{cell}$ of the detected cell/base station and the coarse time offset estimate value $\Delta t_{CTOE}$ associated with the detected cell/base station. The cell identifier value $N_{ID}^{cell}$ of the detected cell/base station and the coarse time offset estimate value $\Delta t_{CTOE}$ associated with the detected cell/base station result from the maximum value of the correlation metric values $r_c[j,n_0]$:

$$\underset{j,n_0}{\mathrm{argmax}}\, r_c[j, n_0] = \{N_{ID}^{cell}, \Delta t_{CTOE}\} \mid_{\substack{j\_max \\ n_{0\_max}}}$$

On the basis of the cell identifier value $N_{ID}^{cell}$ of the detected cell/base station, the reference sequence $S_{PCID}[k]$ corresponding the cell identifier value $N_{ID}^{cell}$ of the detected cell/base station is provided in an operation S255 and should be denoted as $$S_{j\_max}[k] = S_{PCID}[k], PCID \in \{0, \ldots, N_{ref}-1\} \wedge k = -31 \ldots 31/\{0\}.$$

The reference sequence $S_{PCID}[k]$ may be pre-calculated and stored in a storage for retrieval thereof or the reference sequence $S_{PCID}[k]$ may be generated on request.

A set of $N_{fine}$ phase-rotated reference sequences is generated from the reference sequence $S_{PCID}[k]$, cf. operation S260. The rotation angles in phase of the reference sequences $S_{PCID}[k]$ model Secondary Synchronization Signal (SSS) symbols received from a cell/base station at the receiver at different time offsets $\Delta t_{fine}$. The different time offsets $\Delta t_{fine}$ are determined on the basis of the coarse time offset estimate value $\Delta t_{CTOE}$ from the maximum value of the correlation metric values $r_f[n_0]$. The time offsets may be predefined, for instance set of $N_{fine}$ time offsets $\Delta t_{fine}$ may comprise following values $$\Delta t_{fine} = \Delta t_{CTOE} + \left( -\frac{T_g}{2} : T_{Sample} : \frac{T_g}{2} \right).$$

The resolution and span may be adjusted depending on processing capabilities and constraints. The time offsets may be defined as normalized time offsets $\Delta n_{fine}$:

$$\Delta n_{fine} = \Delta n_{CTOE} + \left( -\frac{T_g}{2T_{Sample}} : 1 : \frac{T_g}{2T_{Sample}} \right).$$

A set of $N_{fine}$ phase-rotated reference sequences $S_{PCID}^{(n_0)}[k]$ is generated based on the reference sequence $S_{PCID}[k]$:

$$S_{PCID}^{(n_0)}[k] = S_{PCID}[k] \cdot \exp\left( -j2\pi \frac{kn_0}{N} \right)$$

where $n_0 \in C_{fine} \wedge C_{fine} := C_{coarse}(\Delta t_{fine})$ represents the set of rotation phase candidates in number of samples.

In an operation S265, each phase-rotated reference sequence $S_{PCID}^{(n_0)}[k]$ of the set thereof is correlated in frequency domain with the transformed sample data $R[k]$ of the extracted block retrievable from the buffer $$r_f[n_0] = \left| \sum_{\substack{k=-31 \\ k \neq 0}}^{k=31} R[k] S_{PCID}^{(n_0)}[k]^* \right|^2, n_0 \in C_{fine}$$

A correlation matric value $r_f[n_0]$ of each phase-rotated reference symbol of the secondary synchronization reference symbol $S_{PCID}[k]$ corresponding to the cell identifier value $N_{ID}^{cell}$ of the detect cell/base station with the buffered transformed sample data is determined Hence, the correlation values is function of one variables: the rotation phase $n_0$ corresponding to a time offset value $\Delta t_{fine}^{(n_0)}$.

The maximum $r_f[n_{0\_max}]$ of the $N_{fine}$ correlation values $r_f[n_0]$ is determined; cf. operation S270.

$$\{\Delta t_{FTOE}\} = \arg\max_{n_0} r_f[n_0] \Big|_{n_{0\_max}}$$

The maximum value $r_f[n_{0\_max}]$ yields a rotation phase candidate value $n_{0\_max}$ corresponding to a fine time offset value $$\Delta t_{fine}^{(n_{0\_max})} = \Delta t_{FTOE}$$

of the detected cell/base station, cf. operation S275.

In summary, the fine time offset estimation involves correlating the buffered transformed sample data comprising the Secondary Synchronization Signals (SSS), which are received from the neighboring cells/base stations, with the phase-rotated reference symbols on the basis of the reference symbol according to the detected cell/base station using the coarse time offset estimation. The maximum value of the correlation metric yields a refined time offset estimate value of the detected cell/base station.

Figure 12:
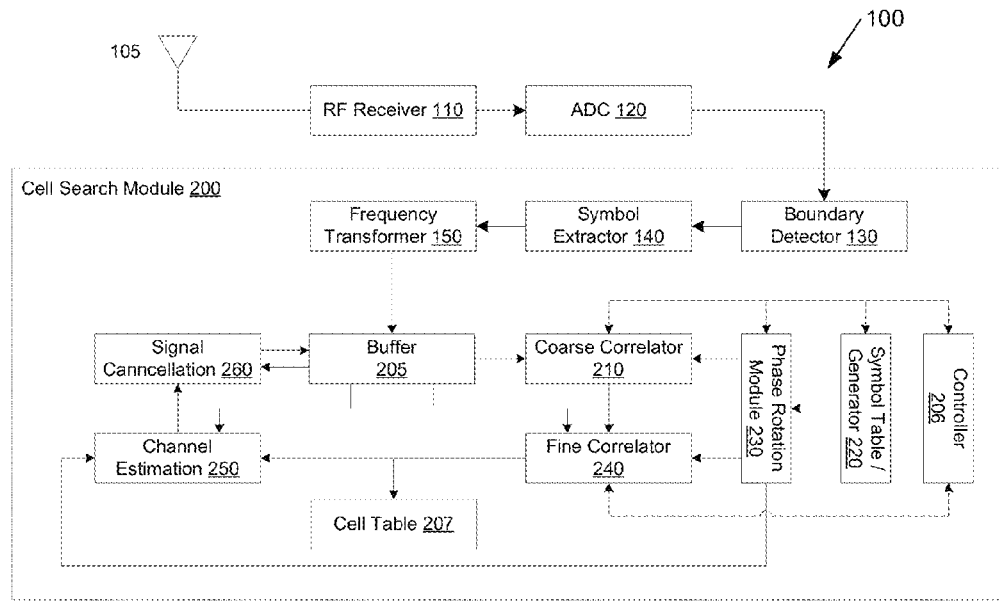
FIG. 12 schematically illustrates a block diagram of a base station enabled for cell detection and channel estimation with synchronization signals from multiple base stations, which are not time synchronized, according to an example of the present invention.

With reference to FIG. 12, an OFDM receiver 100 in accordance with an example of the present application is illustratively shown in block diagram form. The example OFDM receiver 100 is enabled to perform the above described cell search process. It should be understood that those blocks are illustrated in FIG. 12, which are necessary to understand and/or involved in the cell search process.

The OFDM receiver 100 includes inter alia one or more antennas 105, an analog RF receiver block 110, an analog-to-digital converter ADC 120 and a cell search module 200. Those skilled in the art are aware that an operational OFDM receiver may comprise further components such as a cyclic prefix (CP) removal block 120, and decoder block, which are out of the scope of the present application.

The RF signals organized in radio frames, sub-frames and slots are received by the one or more antennas 105 and fed through the analog RF receiver block 110 coupled to the or more antennas 105. Each of the slots of received RF signals comprises 6 or 7 ODFM symbols provided with extended and normal cyclic prefixes, respectively. The analog-to-digital converter ADC 120 is coupled to the analog RF receiver block 110 and converts the analog RF signal into a stream of sample data. The sampling time depends on the channel bandwidth, which in case of LTE/LTE-A includes 1.25 MHz, 2.5 MHz, 5 MHz, 10 MHz, 15 MHz, and 20 MHz. In accordance with the used channel bandwidth, the number of subcarriers N per symbol ranges from 128 to 2048 and the sampling rate is $f_s = \Delta f \cdot N = 15000 \cdot N$, wherein $\Delta f = 15$ kHz.

For cell detection and individual time offset estimation associated with each detected cell/base station, the block of sample data comprising the Secondary Synchronization Signals (SSS) received from the cells/base stations in the surrounding have to be identified. The identification of this block of sample data in the stream thereof is performed by a boundary detector block 130 and a symbol extractor block 140. A frequency transformer block 150 then provides transformed sample data in frequency domain for interactively detecting individual Secondary Synchronization Signals (SSS) transmitted from the neighboring cells/base stations and individual estimates of time offsets with respect to the neighboring cells/base stations.

The stream of sample data is supplied to the boundary detector block 130, which receives the stream of sample data at an input thereof. The boundary detector block 130 is arranged to detect boundaries of the symbols in the sample data stream. The boundary detector block 130 is configured to detect a number of 6 or 7 signal peaks depending on whether normal or extended cyclic prefix (CP) encoding has been applied for the received RF signal. The peak detection enables an indexing of the symbols embedded in the sample data stream.

The boundary detector block 130 is further arranged to detect the radio frame and sub-frame timing starting from the symbol boundary detection yielding to an indexing of the symbols embedded in the stream of sample data. The boundary detector block 130 is configured to detect a Primary Synchronization Signal (PSS) in the sample data stream. As aforementioned, the Primary Synchronization Signal (PSS) transmitted twice each in each radio frame and is located in the last OFDM symbol of the first slot of the first sub-frame (time slot 0, sub-frame 0) and in the last OFDM symbol of the first time slot of the $6^{th}$ sub-frame (time slot 11, sub-frame 4) of each radio frame, in LTE/LTE-A FDD mode. In LTE/LTE-A TDD mode, the Primary Synchronization Signal (PSS) is transmitted twice per radio frame having a periodicity of 5 ms and once per radio frame having a periodicity of 10 ms, wherein the Primary Synchronization Signal (PSS) is located in the third time slot of the second (special) sub-frame (time slot 2, sub-frame 1) per radio frame with periodicity of 5 ms or 10 ms. The Primary Synchronization Signal (PSS) is located in the third time slot of the $7^{th}$ (special) sub-frame (time slot 2, sub-frame 6) per radio frame with periodicity of 5 ms. The Primary Synchronization Signal (PSS) sequence is one of three Zadoff-Chu (ZC) sequences correspond to sector cell index value $N_{ID}^{(2)}=0,1,2$.

The boundary detector block 130 may comprise three precomputed reference PSS sequences in time domain and correlates block-wise the precomputed reference PSS sequences with the sample data of the stream generated by the analog-to-digital converter ADC 120. The maximum correlation value yields to the dominate one of the Primary Synchronization Signals (PSS) received from the cells/base stations in the surrounding.

Starting from the detected location of dominate the Primary Synchronization Signal (PSS) in the sample data stream, an extraction window is defined by the symbol extractor block 140. The defined extraction window defines the expected location of the Secondary Synchronization Signals (SSS) in the stream of sample data. The symbol extractor block 140 is configured to extract a block of data samples in accordance with the extraction window and supplies the extracted block of sample data to a frequency transformer block 150 such as a Fast Fourier Transform (FFT) or a Discrete Fourier Transform (DFT) module.

The frequency transformer block 150 is configured to convert the sample data of the extracted block of received from the symbol extractor block 140 to transformed sample data in frequency domain. The transformed sample data are outputted to the buffer 205 for being further processing.

The boundary detector block 130, the symbol extractor block 140 and the frequency transformer may be considered to be part of a cell search module 200. The cell search module 200 further comprises a buffer block 205, a coarse correlator block 210, a fine correlator block 240, a channel estimation block 250 and a signal cancellation block 260. Reference sequences are provided by a symbol table/generator block 220 and a phase rotation block 230 of the cell search module 200.

The buffer block 205 has an input coupled to the signal frequency transformer block 130, and outputs. The buffer block 205 is arranged to buffer the transformed sample data individual by the frequency transformer 150 for retrieval by the signal processing blocks of the cell search module 200.

The reference sequences are provided by a symbol table/generator block 220, which is arranged to store all possible precomputed reference sequences and/or to generate reference sequences on request. The symbol table/generator block 220 may comprise a table storing reference sequences for each Secondary Synchronization Signal (SSS) in frequency domain representation. The table may store reference sequences for each Secondary Synchronization Signal (SSS) encoded for each of the sub-frame 0 and the sub-frame 5. The table may further store information associating each reference sequence with the respective cell identifier value $N_{ID}^{cell}$.

The phase rotation block 230 has an input coupled to the symbol table/generator block 220, an input to receive a rotation phase value and outputs to provide a phase-rotated reference sequence. The phase rotation block 230 is arranged to rotate the phase of the reference sequence received from the symbol table/generator block 220 in accordance with the rotation phase value inputted to the phase rotation block 230.

The coarse correlator block 210 has an input coupled to the buffer block 205 to receive the buffered residual transformed sample data R[k], an input to receive reference sequences from the phase rotation block 210, and an output to output an cell identifier value and a coarse time offset estimate. A controller 206 or a controller section (not shown) of the coarse correlator block 210 is arranged to control the symbol table/generator block 220 and the phase rotation block 230 to output reference sequences, which comprise one set of $N_{coarse}$ phase-rotated reference sequences in accordance with a set of rotation phase values $C_{coarse}$ for each of the $N_{ref}$ possible reference sequences $S_j[k]$. Accordingly, the symbol table/generator block 220 and the phase rotation block 230 are controlled to provide a total number of $N_{coarse} \cdot N_{ref}$ reference sequences $S_j^{(n_0)}[k]$ to the partial correlator block 211 of the coarse correlator block 210.

Figure 13:
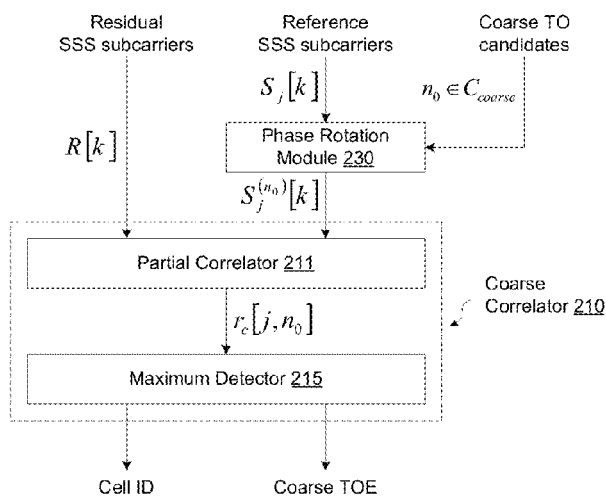
FIG. 13 schematically illustrates a block diagram of a coarse correlator according to an example of the present invention.

Referring now to FIG. 13, an example of the coarse correlator block 210 is shown for the sake of illustration. The coarse correlator block 210 comprises a partial correlator block 211 and a maximum detector block 215. The partial correlator block 211 is arranged to receive the residual transformed sample data R[k] and the $N_{coarse} \cdot N_{ref}$ reference sequences $S_j^{(n_0)}[k]$ and to part-wise correlate the transformed sample data R[k] with each phase-rotated reference sequence $S_j^{(n_0)}[k]$ and combine non-coherently the correlation metric values of parts for each reference sequence $S_j^{(n_0)}[k]$. The partial correlation performed at the partial correlator block 211 yields to a number of $N_{coarse} \cdot N_{ref}$ correlation matric values $r_c[j,n_0]$ for each phase-rotated reference sequence $S_j^{(n_0)}[k]$ with the transformed sample data R[k].

The maximum detector block 215 receives the correlation matric values $r_c[j,n_0]$ from the partial correlator block 211 and is adapted to determine the maximum value $r_c[j\_max, n_{0\_max}]$ of the correlation matric values $r_c[j,n_0]$. The maximum value $r_c[j\_max, n_{0\_max}]$ yields to a cell identifier value $N_{ID}^{cell} = N_{ID}^{(j\_max)}$ and a coarse time offset value $$\Delta t_{coarse}^{(n_{0\_max})} = \Delta t_{CTOE},$$

which are outputted by the coarse correlator block 210.

Referring back to FIG. 12, the fine correlator block 240 has an input coupled to the buffer block 205 to receive the buffered residual transformed sample data R[k], an input to receive the cell identifier value $N_{ID}{}^{cell}=N_{ID}{}^{(j\_max)}$ and the coarse time offset value $\Delta t_{CTOE}$ from the coarse correlator block 210, an input to receive reference sequences from the phase rotation block 210, and an output to output the cell identifier value $N_{ID}{}^{cell}=N_{ID}{}^{(j\_max)}$ and a fine time offset estimate. The controller 206 or a controller section (not shown) of the fine correlator block 240 is arranged to control the symbol table/generator block 220 and the phase rotation block 230 to output reference sequences, which comprise one set of $N_{fine}$ phase-rotated reference sequences in accordance with a set of rotation phase values $C_{fine}$ for the reference sequence $S_{PCID}[k]$ corresponding to the cell identifier value $N_{ID}{}^{cell}=N_{ID}{}^{(j\_max)}$. Accordingly, the symbol table/generator block 220 and the phase rotation block 230 are controlled to provide a total number of $N_{fine}$ reference sequences $S_{PCID}{}^{(n_0)}[k]$ to the partial correlator block 211 of the fine correlator block 240.

Figure 14:
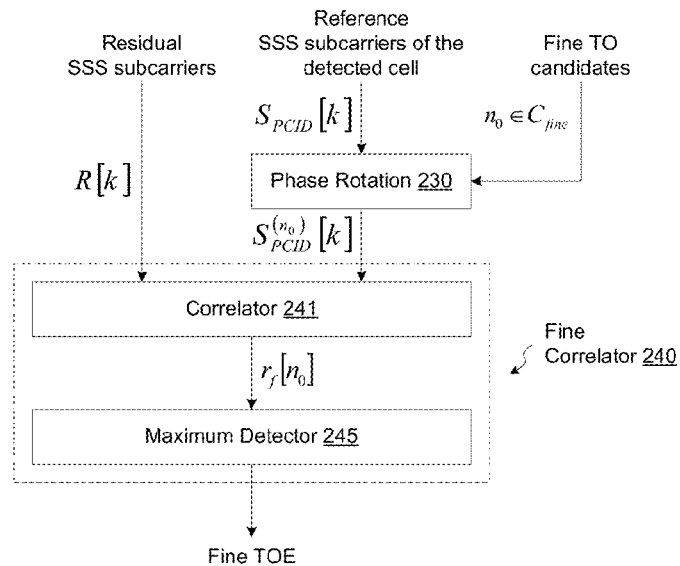
FIG. 14 schematically illustrates a block diagram of a fine correlator according to an example of the present invention.

Referring now to FIG. 14, an example of the fine correlator block 240 is shown for the sake of illustration. The fine correlator block 240 comprises a correlator block 241 and a maximum detector block 245. The correlator block 241 is arranged to receive the residual transformed sample data R[k] and the $N_{fine}$ reference sequences $S_{PCID}{}^{(n_0)}[k]$ and correlate the transformed sample data R[k] with each phase-rotated reference sequence $S_{PCID}{}^{(n_0)}[k]$. The correlation performed at the correlator block 241 yields to a number of $N_{fine}$ correlation matric values $r_f[n_0]$ for each phase-rotated reference sequence $S_{PCID}{}^{(n_0)}[k]$ with the transformed sample data R[k].

The maximum detector block 245 receives the correlation matric values $r_f[n_0]$ from the correlator block 241 and is adapted to determine the maximum value $r_f[n_{0\_max}]$ of the correlation matric values $r_f[n_0]$. The maximum value $r_f[n_{0\_max}]$ yields to a fine time offset value $$\Delta t_{fine}^{(n_{0\_max})} = \Delta t_{FTOE},$$

which is outputted by the fine correlator block 240.

Referring back to FIG. 12, the cell information table block 207 of the cell search module 200 comprises table storing the cell identifier value $N_{ID}{}^{cell}=N_{ID}{}^{(j\_max)}$ obtained by the coarse correlator block 210 in association with the fine time offset value $$\Delta t_{fine}^{(n_{0\_max})} = \Delta t_{FTOE}$$

obtained by the fine correlator block 240 through an input coupled thereto. The table of the cell information table block 207 may further include the coarse time offset value $\Delta t_{CTOE}$ obtained from the coarse correlator block 210 in association with the cell identifier value $N_{ID}{}^{cell}=N_{ID}{}^{(j\_max)}$. One or more inputs of the cell information table block 207 is coupled to the fine correlator block 240 and/or coarse correlator block 210.

The cell identifier value $N_{ID}{}^{cell}$ and the fine time offset value $\Delta t_{FTOE}$ determined by the coarse fine correlator blocks 210, 240 are further provided to a channel estimation block 250, which has an input to receive the values, an input coupled to the symbol table/generator block 220, an input coupled to the buffer block 205 and an output. The channel estimation block 250 is arranged to estimate the channel frequency response $\hat{H}(f)$ based on the fine time offset value $\Delta t_{FTOE}$ for the channel other which the Secondary Synchronization Signal (SSS) of the cell/base station identified by the cell identifier value $N_{ID}{}^{cell}$ is received. The channel estimation block 250 is coupled to the phase rotation block 230 to receive a regenerated phase-rotated Secondary Synchronization Signal (SSS) sequence $S^{(\Delta t)}[k]$ of the detected cell/base station corresponding to the cell identifier value $N_{ID}{}^{cell}$ and the fine time offset value $\Delta t_{FTOE}$ determined for the detected call/bases station. The channel frequency response estimate $\hat{H}(f)$ is provided at the output of the channel estimation block 250.

The signal cancellation block 260 has an input coupled to the channel estimator block 250 to receive the channel frequency response estimate $\hat{H}(f)$, and the regenerated phase-rotated Secondary Synchronization Signal (SSS) sequence $S^{(\Delta t)}[k]$ of the detected cell/base station through a respective input. The signal cancellation block 260 is coupled to the buffer block 205 for accessing the buffered transformed sample data.

The signal cancellation block 260 is arranged to cancel the signal contribution of the detected cell/base station to the sample data buffered in the buffer block 205. The signal cancellation block 260 generates a modelled Secondary Synchronization Signal (SSS) sequence corresponding to the regenerated phase-rotated Secondary Synchronization Signal (SSS) sequence $S^{(\Delta t)}[k]$ and the channel frequency response estimate $\hat{H}(f)$ to eliminate substantially the contribution of the Secondary Synchronization Signal (SSS) received from detected cell/base station from the buffered transformed sample data in the buffer block 205.

The controller block 206 of the channel search module 200 may be arranged to control the cell search procedure as exemplified above with reference to FIG. 9 and further with reference to FIGS. 10 and 11. In particular, the controller block 206 is arranged to control the operation of the processing blocks as exemplified above. More particularly, the controller block 206 controls the symbol table/generator block 220 to supply the reference symbols to the phase rotation block 230, controls the phase rotation block 230 to rotate the supplied reference symbols about a determined rotation phase corresponding to a determined time shift and the correlator blocks 210 and 240 to perform the respective correlation and maximum determination operations, respectively.

The controller block 206 may be further arranged to determine whether all Secondary Synchronization Signals (SSS) included in the buffered transformed sample data are detected or not to end the cell search procedure performed with the help of the cell search module 200. The cell identifier value $N_{ID}{}^{cell}$ of each detectable neighboring cell/base station and the refined time offset value $\Delta t_{fine}$ associated therewith are retrievable from the cell information table block 207 or supplied by the cell information table block 207 for further processing.

From the above description those skilled in the art appreciate that the methodology proposed in the present application is applicable to quasi-time-aligned cells, base stations or (e)NodeBs, the transmissions of which are frame-aligned. The time offsets of the received transmission can be traced back to signal propagation conditions including distance and multipath such that received signals have different delays at the receiver side. However, those skilled in the art will also appreciate from the above description that the proposed methodology of the present application is also applicable in case of non-frame-aligned cells, base stations or (e)NodeBs provided that multiple alignments are detectable on the basis of the symbol boundary detection and/or PSS detection. For each of the multiple alignments, a different Secondary Synchronization Symbol detection and time offset estimation procedure is operated.

The present application may be understood with reference to a smart base station (smart eNodeB) that listening for downlink signals of one or more neighboring base stations such as macro base stations in order to identify the base stations in the neighborhood and further to for instance determine time and frequency synchronization. The cell search may be part of a network listen process.

Figure 15:
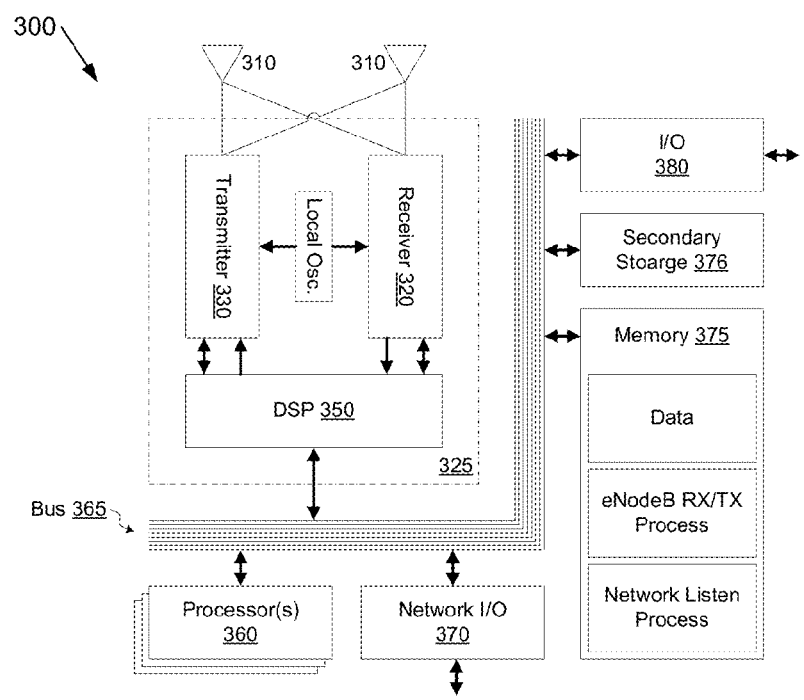
FIG. 15 schematically illustrates a block diagram of a base station enabled for cell detection and channel estimation with synchronization signals from multiple base stations, which are not time synchronized, according to a further example of the present invention.

With reference to FIG. 15, a possible implementation of a femto base station 300 as an example of a smart base station is illustratively shown that includes signal and data processing components suitable for implementing the cell search procedure according to an example disclosed herein. In general, the smart base station 300 is configured according to an example of the present application.

Signals received by one or more antennas 310 through cellular communication network are input to a transceiver 325, which comprises for instance a receiver 320 and a transmitter 330. The receiver 320 may perform such common receiver functions as signal amplification, frequency down conversion, filtering, channel selection and the like. Analog to digital (ADC) conversion of a received signal allows more complex communication functions such as demodulation and decoding to be performed in a digital signal processor (DSP) 350. In a similar manner, signals to be transmitted are processed, including modulation and encoding for example, by the DSP 350 and input to transmitter 330 for digital to analog (DAC) conversion, frequency up conversion, filtering, amplification and transmission over the cellular communication network via the one or more antennas 310. The DSP 350 not only processes communication signals, but also provides for receiver and transmitter control. For example, the gains applied to communication signals in receiver 320 and transmitter 330 may be adaptively controlled through automatic gain control algorithms implemented in DSP 350.

In addition to a processor 360 (which may be referred to as a central processor unit or CPU), the base station 300 might include network connectivity devices 370, a memory 375 including random access memory (RAM) and read only memory (ROM), a secondary storage 376, and input/output (I/O) devices. These components may communicate with one another via one or more buses 365, switched interconnects, fabrics, and/or any combination thereof. In some cases, some of these components may not be present or may be combined in various combinations with one another or with other components not shown. These components might be located in a single physical entity or in more than one physical entity. Any actions described herein as being taken by the base station 300 might be taken by any one of the components thereof, a combination of the components thereof, the processor 360 alone or by the processor 350 in conjunction with one or more components shown or not shown in FIG. 15, such as a digital signal processor (DSP) 350. Although the DSP 350 is shown as a separate component, the DSP 350 might be incorporated into the processor 360.

The central processor 360 and the digital signal processor (DSP) 350 should be understood as processing units, which execute instructions, codes, computer programs, or scripts that it might access from the network connectivity devices 370, the input/output (I/O) devices, the memory 375 (e.g. RAM and/or ROM) or secondary storage 376, which might include various disk-based systems such as hard disk, floppy disk, or optical disk or any other mass storage technology based devices. While only one CPU 360 and/or DPS 350 is shown, multiple processors or processing cores may be present. Thus, while instructions may be discussed as being executed by one or the processors, the instructions may be executed simultaneously, serially, or otherwise by one or multiple processors. The processor 360 may be implemented as one or more CPU chips.

The network connectivity devices 370 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, LTE-A (LTE advanced) radio transceiver devices, worldwide interoperability for microwave access (WiMAX) devices, and/or other well-known devices for connecting to networks. These network connectivity devices 370 may enable the processor 360 to communicate with the Internet or with one or more telecommunications networks or other networks from which the processor 360 might receive information or to which the processor 360 might output information. The network connectivity devices 370 might also include one or more transceiver components capable of transmitting and/or receiving data wirelessly.

The RAM might be used to store volatile data and perhaps to store instructions that are executed by the processor 360. The ROM is a non-volatile memory device that typically has a smaller memory capacity than the memory capacity of the secondary storage 376. ROM might be used to store instructions and perhaps data that are read during execution of the instructions. Access to both RAM and ROM is typically faster than to secondary storage 376. The secondary storage 376 is typically comprised of one or more solid state drives, disk drives or tape drives and might be used for non-volatile storage of data or as an over-flow data storage device if RAM is not large enough to hold all working data. Secondary storage 376 may be used to store programs that are loaded into RAM when such programs are selected for execution.

Further, one or more I/O devices 380 may include liquid crystal displays (LCDs), touch screen displays, keyboards, keypads, switches, mice, card readers, video monitors, or other well-known input/output devices. The transceiver 325 might be also considered to form a component of the I/O devices 380 instead of or in addition to being a component of the network connectivity devices 370.

As will be readily apparent to one skilled in the art, the cellular communications/eNodeB RX/TX process and network listen/cell search process may configure the one or more processors 350, 360 to operate the transceiver 320 and/or the network listen/cell search procedure in a manner that provides voice communication and data services over a wireless radio frequency cellular communications network.

In particular, the network listen/cell search process is implemented on the basis of one or more software components executable on the one or more processor(s) 360 and the digital signal processor (DSP) 350. More particularly, the network listen/cell search process is configured to make use of accelerator components implemented in the base station 300 such as one or more fast Fourier transform components being part of the digital signal processor (DSP) 350.

The time offset estimation process described above with reference to examples of the present disclosure is in particular robust against a lacking synchronization. Simulations have been performed to demonstrate the robustness of the suggested method and implementation thereof. The following scenario has been used for simulation:

channel conditions in accordance with ITU indoor channel A Model according to ITU-R recommendation M.1225; and 6 neighboring cells eNB1 to eNB6 each operating orthogonal frequency division multiplexing (OFDM) radio frequency communication at a bandwidth of 5 MHz, normal cyclic prefix and with equal power.

A maximum time offset spread has been swept between 0 samples (which corresponds to all cells sNB1 to eNB6 in synchronicity) and 15 samples. For each maximum offset spread, the time offset is increased linearly from cell eNB1 to cell eNB6, wherein the last cell eNB6 has a time offset corresponding to the maximum time offset spread.

Figure 16:
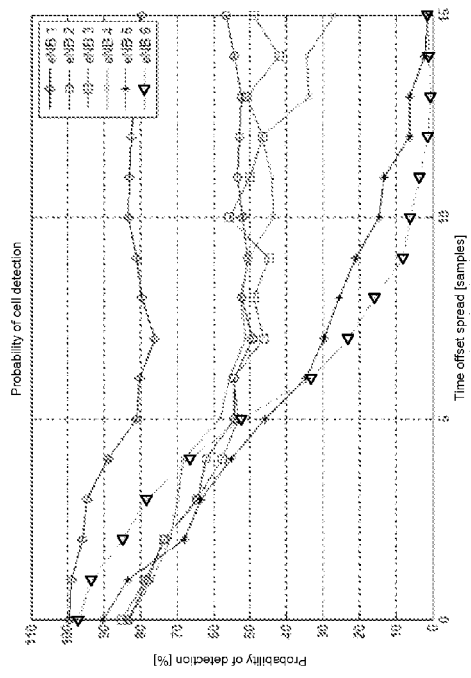
FIG. 16 schematically illustrates a diagram exemplifying the probability of cell detection using a state of the art cell search procedure without time offset estimation.
Figure 17:
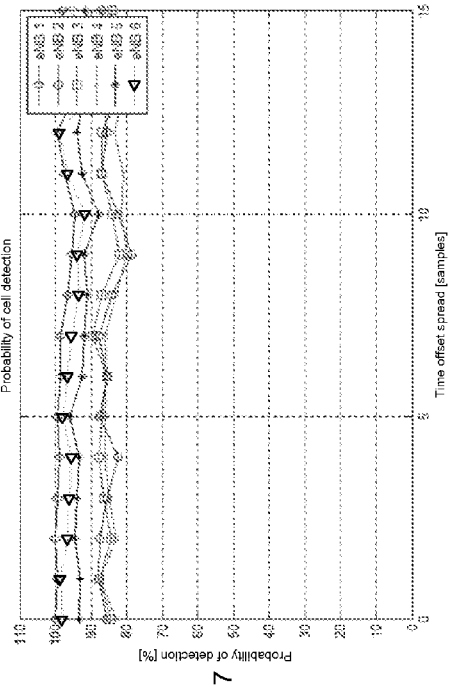
FIG. 17 schematically illustrates a diagram exemplifying the probability of cell detection using a cell search procedure with time offset estimation according to an example of the present invention.

FIG. 16 illustrates the detection probability of neighboring cells as a function of the maximum time offset spread when using the state of the art cell detection methodology under the above mentioned conditions. The state of the art cell detection methodology does not make use of time offset estimation and correction. In contrast thereto, FIG. 17 illustrates the detection probability of neighboring cells as a function of the maximum time offset spread when using the cell detection methodology according to an example of the present invention in a cellular network subjected to the above mentioned conditions. When comparing the detection probability graphs shown in FIGS. 16 and 17, the skilled person immediately understands that in particular the probability of detection significantly increases with increasing time offset and maximum time offset spread, respectively.

Figure 18:
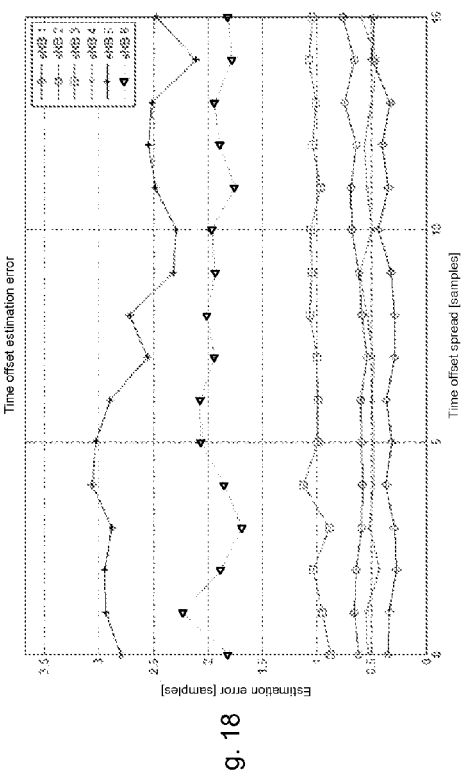
FIG. 18 schematically illustrates a diagram exemplifying the mean error of the time offset estimation when using a cell search procedure according to an example of the present invention.

With reference to FIG. 18, the mean absolute error (in samples) of the time offset estimate of each cell eNB1 to eNB6 as a function of the maximum time offset spread is shown. The mean absolute error shown in FIG. 18 has been determined in accordance with the cell detection methodology according to an example of the present invention of FIG. 17.

Figure 19:
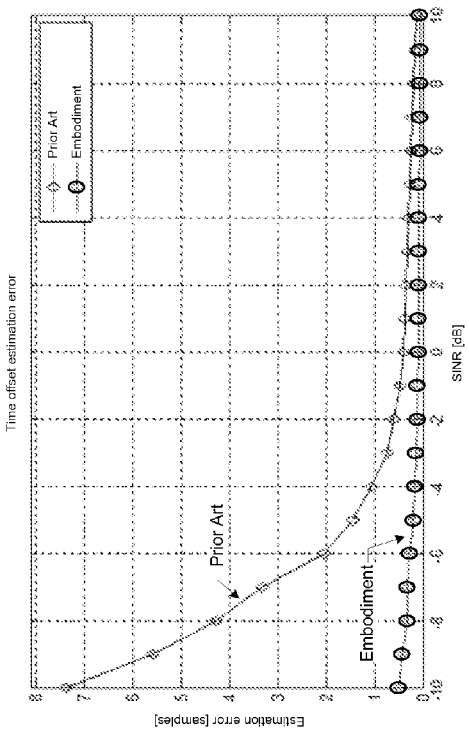
FIG. 19 schematically illustrates a diagram exemplifying the mean error of the time offset estimation as a function of the signal to noise ration when using a state of the art cell search procedure without time offset estimation and a cell search procedure according to an example of the present invention.

Referring now to FIG. 19, graphs showing mean absolute errors (in samples) of the time offset estimate of each cell eNB1 to eNB6 as a function of the signal to noise ratio (in dB) are illustrated. The prior art graph has been determined on the basis of the methodology set forth in "Synchronization and Cell Search Algorithms in 3GPP Long Term Evolution Systems (FDD mode)" by Abdo N. Gaber et al. published in WSEAS TRANSACTIONS on COMMUNICATIONS, Issue 2, Volume 11, February 2012, which describes a coarse and fractional time offset estimation using primary and secondary synchronization signals, and U.S. Pat. No. 6,891,792 B1 by Leonard Joseph Cimini et al., which describes a frequency domain approach for time offset estimation, respectively. The cell detection methodology proposed in the present application results in significantly improved mean absolute error (in samples) of the time offset estimate for lower signal to noise ratios.

In particular, the state of the art methodologies suggest to determine a refined time offset estimation in frequency domain by extracting shifts between adjacent subcarriers. As immediately understood from the graphs shown in FIG. 19, the methodology of direct time offset estimation using phase differences is sensitive to interference and noise, respectively. The cell detection methodology according to embodiments of the present invention result in an improved code separation and hence is more robust against interference and noise, respectively.

According to an example of the present application, a method of operating a multicarrier communication receiver is suggested. The method comprises retrieving sample data transformed in frequency domain from a buffer (205) of the receiver (100, 300), wherein the sample data comprises synchronization symbols each received from one of a plurality of wireless communication cells; detecting one wireless communication cell out of the by plurality of wireless communication cells, and estimating a fine time offset value for the one wireless communication cell.

The detecting of one wireless communication cell out of the plurality of wireless communication cells is performed by providing a first set of phase-rotated reference sequences, which are based on a set of different reference sequences and a first set of rotation phase values, determining first correlation metric values by applying a partial correlation comprising part-wise correlating the sample data with each one of the first set of phase-rotated reference sequences and non-coherent combining the partial correlation values of the parts for each one of the first set of phase-rotated reference sequences, and determining a first maximum value of the first correlation metric values, wherein the first maximum value yields to a cell identifier value;

The estimating of a fine time offset value for the one wireless communication cell is performed by providing a second set of phase-rotated reference sequences, which are based on a reference sequence associated with the cell identifier value and a second set of rotation phase values, determining second correlation metric values by applying a correlation comprising correlating the he sample data with each one of the second set of phase-rotated reference sequences, and determining a second maximum value of the second correlation metric values, wherein the second maximum value yields to a fine time offset;

The method further comprises regenerating a synchronization symbol corresponding to the phase-rotated synchronization reference symbol based on the cell identifier value and the fine time offset; and cancelling the regenerated synchronization symbol from the sample data in the buffer (205).

According to an example of the present application the first maximum value further yields to a coarse time offset value, wherein the rotation phase values of the second set of rotation phase values are selected around the coarse time offset value.

According to an example of the present application, the method further comprises repeating the method until at least a predefined number of synchronization symbols comprised in the sample data is detected.

According to an example of the present application, the method further comprises at least one of: determining a time offset value based on the rotation phase value of the phase-rotated reference sequence, which is associated with the first maximum value; and determine the cell identification value based on the reference symbol corresponding to the phase-rotated reference sequence, which is associated with the first maximum value.

According to an example of the present application, the first set of phase-rotated reference sequences comprises $N_{coarse} \cdot N_{ref}$ phase-rotated reference sequences, which are generated on the basis of the set of $N_{ref}$ different reference sequences and the first set of $N_{coarse}$ rotation phase values.

According to an example of the present application, the second set of phase-rotated reference sequences comprises $N_{fine}$ phase-rotated reference sequences, which are generated on the basis of the reference sequence associated with the cell identifier value and a second set of $N_{fine}$ rotation phase values.

According to an example of the present application, the providing of the first set of phase-rotated reference sequences further comprises providing a set of all possible reference sequences corresponding to the synchronization symbols applicable by the wireless communication cells to indicate synchronization information; and generating a phase-rotated reference sequence for each of the set of all possible reference sequences, wherein the generated phase-rotated reference sequences form the first set of phase-rotated reference sequences.

According to an example of the present application, the method further comprises receiving a time-domain RF signal by one or more antennas (105) from the plurality of wireless communication cells, converting the received RF signal to a stream of sample data; determining timing information relating to the structure of the stream of sample data; extracting a block of sample data from the stream based in the timing information, wherein the sample data of the block comprises the synchronization symbols; transforming the sample data of the extracted block into frequency domain; and buffering the transformed sample data in the buffer (205).

According to an example of the present application, the method further comprises determining symbol boundaries in the stream of sample data; detecting a primary synchronization signal in the stream of sample data on the basis of the symbol boundaries; and determining an extraction window for extracting the block of sample data on the basis of the location of the detected primary synchronization signal in the stream of sample data and a predefined offset.

According to an example of the present application, the method further comprises determining an estimate of a channel frequency response based on the cell identifier value and the fine time offset.

According to an example of the present application, the multicarrier communication receiver (100, 300) is an orthogonal frequency division multiplexing (ODFM) receiver (100, 300). The synchronization symbols received from the plurality of wireless communication cells are ODFM synchronization symbols.

According to an example of the present application, the wireless communication cells are arranged to operate cellular communication according to at least one of the Long Time Evolution, LTE, standard and Long Time Evolution Advanced, LTE-A, standard.

According to an example of the present application, the synchronization symbols received from the plurality of wireless communication cells are Second Synchronization Signal (SSS) symbols, wherein the reference sequences represent Second Synchronization Signal (SSS) symbols in frequency domain.

According to an example of the present application, a multicarrier communication receiver, in particular an orthogonal frequency division multiplexing (OFDM) receiver is provided. The receiver comprises a buffer block (205) arranged to buffer sample data transformed in frequency domain, which comprises synchronization symbols each received from one of a plurality of wireless communication cells; a coarse correlator block (210) coupled to the buffer block (205) to retrieve the sample data therefrom; a fine correlator block (240) coupled to the buffer block (205) to retrieve the sample data therefrom; and a signal cancellation block (260) coupled to the buffer block (205).

The coarse correlator block (210) is arranged to detect one wireless communication cell out of the by plurality of wireless communication cells by determining first correlation metric values by applying a partial correlation comprising part-wise correlating the sample data with each one of a first set of phase-rotated reference sequences and non-coherent combining the partial correlation values of the parts for each one of the first set of phase-rotated reference sequences, and determining a first maximum value of the first correlation metric values, wherein the phase-rotated reference sequences of the first set are based on a set of different reference sequences and a first set of rotation phase values, wherein the first maximum value yields to a cell identifier value.

The fine correlator block (240) is arranged to estimate a fine time offset value for the one wireless communication cell by determining second correlation metric values by applying a correlation comprising correlating the he sample data with each one of a second set of phase-rotated reference sequences and determining a second maximum value of the second correlation metric values, wherein the phase-rotated reference sequences of the second set are based on a reference sequence associated with the cell identifier value and a second set of rotation phase values; wherein the second maximum value yields to a fine time offset;

The signal cancellation block (260) is arranged to regenerate a synchronization symbol based on the cell identifier value and the fine time offset; and to cancel the regenerated synchronization symbol from the sample data in the buffer (205).

According to an example of the present application, the receiver further comprises a symbol table/generator block (220) arranged to provide one or more reference sequences; and a phase rotation block (230) coupled to the synchronization reference generator block (220) to receive the one or more reference sequences and arranged to generate a phase-rotated reference sequence on the basis of each received reference sequence predetermined rotation phase value. The phase rotation block (230) is coupled to the coarse correlator block (210) and the fine correlator block (240).

According to an example of the present application, the symbol table/generator block (220) is arranged to provide a set of $N_{ref}$ different reference sequences, wherein the phase rotation block (230) is arranged to generate the first set of $N_{coarse} \cdot N_{ref}$ phase-rotated reference sequences on the basis of the set of $N_{ref}$ different reference sequences and the first set of $N_{coarse}$ rotation phase values.

According to an example of the present application, the synchronization reference generator block (220) is arranged to provide a reference sequence associated with the cell identifier value, wherein the phase rotation block (230) is arranged to generate the second set of $N_{fine}$ phase-rotated reference sequences on the basis of the one reference sequence and the second set of $N_{fine}$ rotation phase values.

According to an example of the present application, the receiver further comprises a channel estimation block (250) coupled to the buffer block (205) and the fine correlator block (240). The channel estimation block (250) is arranged to determine an estimate of a channel frequency response on the basis of the fine time offset.

According to an example of the present application, the receiver further comprises one or more antennas (105) for receiving a time-domain RF signal from the plurality of wireless communication cells; an analog-to-digital converter (120) configured to convert the received RF signal to a stream of sample data; a boundary detector (130) configured to determine timing information relating to the structure of the stream of sample data; a symbol extractor (140) configured to extract a block of sample data from the stream based in the timing information, wherein the sample data of the block comprises the synchronization symbols; and a frequency transformer (150) configured to transform the sample data of the extracted block to transformed sample data. The transformed sample data is supplied by the frequency transform block (150) to the buffer block (205) coupled thereto for being buffered thereat.

According to an example of the present application, the symbol extractor (140) is further configured to determine symbol boundaries in the stream of sample data and detect a primary synchronization signal in the stream of sample data on the basis of the symbol boundaries. An extraction window for extracting the block of sample data is determined on the basis of the location of the detected primary synchronization signal in the stream of sample data and a predefined offset.

According to an example of the present application, the receiver further comprises a controller block (206) coupled to at least the coarse correlator block (210) and the fine correlator block (240) and arranged to control the blocks (210, 240) according to the method of claim 1.

According to an example of the present application, the receiver supports orthogonal frequency division multiplexing (ODFM). The synchronization symbols received from the plurality of wireless communication cells are transmitted using ODFM.

According to an example of the present application, the receiver is capable of cellular communication according to at least one of the Long Time Evolution, LTE, standard and Long Time Evolution Advanced, LTE-A, standard.

According to an example of the present application, the synchronization symbols received from the plurality of wireless communication cells are Second Synchronization Signal (SSS) symbols, wherein the reference sequences represent Second Synchronization Signal (SSS) symbols in frequency domain.

According to an example of the present application, a non-transitory, tangible computer readable storage medium bearing computer executable instructions for operating a multicarrier communication receiver. The instructions, when executing on one or more processing devices, cause the one or more processing devices to perform the aforementioned method of operating a multicarrier communication receiver.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of operating a multicarrier communication receiver, said method comprising: retrieving sample data transformed in frequency domain from a buffer of the receiver, wherein the sample data comprises synchronization symbols each received from one of a plurality of wireless communication cells; detecting one wireless communication cell out of the plurality of wireless communication cells by providing a first set of phase-rotated reference sequences, which are based on a set of different reference sequences and a first set of rotation phase values, determining first correlation metric values by applying a partial correlation comprising part-wise correlating the sample data with each one of the first set of phase-rotated reference sequences and non-coherent combining the partial correlation values of the parts for each one of the first set of phase-rotated reference sequences, and determining a first maximum value of the first correlation metric values, wherein the first maximum value yields to a cell identifier value; estimating a fine time offset value for the one wireless communication cell by providing a second set of phase-rotated reference sequences, which are based on a reference sequence associated with the cell identifier value and a second set of rotation phase values, determining second correlation metric values by applying a correlation comprising correlating the sample data with each one of the second set of phase-rotated reference sequences, and determining a second maximum value of the second correlation metric values, wherein the second maximum value yields to a fine time offset; regenerating a synchronization symbol corresponding to the phase-rotated synchronization reference symbol based on the cell identifier value and the fine time offset; and cancelling the regenerated synchronization symbol from the sample data in the buffer.

2. The method according to claim 1,
wherein the first maximum value further yields to a coarse time offset value,
wherein the rotation phase values of the second set of rotation phase values are selected around the coarse time offset value.

3. The method according to claim 1, further comprising:
repeating the method until at least a predefined number of synchronization symbols comprised in the sample data is detected.

4. The method according to claim 1, further comprising at least one of:
determining a time offset value based on the rotation phase value of the phase-rotated reference sequence, which is associated with the first maximum value; and
determine the cell identification value based on the reference symbol corresponding to the phase-rotated reference sequence, which is associated with the first maximum value.

5. The method according to claim 1,
wherein the first set of phase-rotated reference sequences comprises $N_{course} \cdot N_{ref}$ phase-rotated reference sequences, which are generated on the basis of the set of $N_{ref}$ different reference sequences and the first set of $N_{coarse}$ rotation phase values;

wherein the second set of phase-rotated reference sequences comprises $N_{fine}$ phase-rotated reference sequences, which are generated on the basis of the reference sequence associated with the cell identifier value and a second set of $N_{fine}$ rotation phase values.

6. The method according to claim 1, wherein said providing of said first set of phase-rotated reference sequences further comprises:
providing a set of all possible reference sequences corresponding to the synchronization symbols applicable by the wireless communication cells to indicate synchronization information; and
generating a phase-rotated reference sequence for each of the set of all possible reference sequences, wherein the generated phase-rotated reference sequences form the first set of phase-rotated reference sequences.

7. The method according to claim 1, further comprising:
receiving a time-domain RF signal by one or more antennas from the plurality of wireless communication cells,
converting the received RF signal to a stream of sample data;
determining timing information relating to the structure of the stream of sample data;
extracting a block of sample data from the stream based in the timing information, wherein the sample data of the block comprises the synchronization symbols;
transforming the sample data of the extracted block into frequency domain; and
buffering the transformed sample data in the buffer.

8. The method according to claim 7, further comprising:
determining symbol boundaries in the stream of sample data;
detecting a primary synchronization signal in the stream of sample data on the basis of the symbol boundaries; and
determining an extraction window for extracting the block of sample data on the basis of the location of the detected primary synchronization signal in the stream of sample data and a predefined offset.

9. The method according to claim 1, further comprising:
determining an estimate of a channel frequency response based on the cell identifier value and the fine time offset.

10. The method according to claim 1, further comprising:
wherein the multicarrier communication receiver is an orthogonal frequency division multiplexing receiver,
wherein the wireless communication cells are arranged to operate cellular communication according to at least one of the Long Time Evolution, LTE, standard and Long Time Evolution Advanced, LTE-A, standard,
wherein the synchronization symbols received from the plurality of wireless communication cells are Second Synchronization Signal, SSS, symbols,
wherein the reference sequences represent Second Synchronization Signal, SSS, symbols in frequency domain.

11. A multicarrier communication receiver, comprising: a buffer block arranged to buffer sample data transformed in frequency domain, which comprises synchronization symbols each received from one of a plurality of wireless communication cells; a coarse correlator block coupled to the buffer block to retrieve the sample data therefrom, wherein the coarse correlator block is arranged to detect one wireless communication cell out of the by plurality of wireless communication cells by determining first correlation metric values by applying a partial correlation comprising part-wise correlating the sample data with each one of a first set of phase-rotated reference sequences and non-coherent combining the partial correlation values of the parts for each one of the first set of phase-rotated reference sequences, and determining a first maximum value of the first correlation metric values, wherein the phase-rotated reference sequences of the first set are based on a set of different reference sequences and a first set of rotation phase values, wherein the first maximum value yields to a cell identifier value; a fine correlator block coupled to the buffer block to retrieve the sample data therefrom, wherein the fine correlator block is arranged to estimate a fine time offset value for the one wireless communication cell by determining second correlation metric values by applying a correlation comprising correlating the sample data with each one of a second set of phase-rotated reference sequences and determining a second maximum value of the second correlation metric values, wherein the phase-rotated reference sequences of the second set are based on a reference sequence associated with the cell identifier value and a second set of rotation phase values, wherein the second maximum value yields to a fine time offset; and a signal cancellation block coupled to the buffer block, wherein the signal cancellation block is arranged to regenerate a synchronization symbol based on the cell identifier value and the fine time offset; and to cancel the regenerated synchronization symbol from the sample data in the buffer.

12. The receiver of claim 11, further comprising: a symbol table/generator block arranged to provide one or more reference sequences; and a phase rotation block coupled to the synchronization reference generator block to receive the one or more reference sequences and arranged to generate a phase-rotated reference sequence on the basis of each received reference sequence predetermined rotation phase value, wherein the phase rotation block is coupled to the coarse correlator block and the fine correlator block.

13. The receiver of claim 11,
wherein the symbol table/generator block is arranged to provide a set of $N_{ref}$ different reference sequences, wherein the phase rotation block is arranged to generate the first set of $N_{course} \cdot N_{ref}$ phase-rotated reference sequences on the basis of the set of $N_{ref}$ different reference sequences and the first set of $N_{coarse}$ rotation phase values.

14. The receiver of claim 11,
wherein the synchronization reference generator block is arranged to provide a reference sequence associated with the cell identifier value, wherein the phase rotation block is arranged to generate the second set of $N_{fine}$ phase-rotated reference sequences on the basis of the one reference sequence and the second set of $N_{fine}$ rotation phase values.

15. The receiver of claim 11, further comprising:
a channel estimation block coupled to the buffer block and the fine correlator block,
wherein the channel estimation block is arranged to determine an estimate of a channel frequency response on the basis of the fine time offset.

16. The receiver of claim 11, further comprising:
one or more antennas for receiving a time-domain RF signal from the plurality of wireless communication cells;
an analog-to-digital converter configured to convert the received RF signal to a stream of sample data;
a boundary detector configured to determine timing information relating to the structure of the stream of sample data;

a symbol extractor configured to extract a block of sample data from the stream based in the timing information, wherein the sample data of the block comprises the synchronization symbols; and
a frequency transformer configured to transform the sample data of the extracted block to transformed sample data,
wherein the transformed sample data is supplied by the frequency transform block to the buffer block coupled thereto for being buffered thereat.

17. The receiver of claim 16,
wherein the symbol extractor is further configured to determine symbol boundaries in the stream of sample data and detect a primary synchronization signal in the stream of sample data on the basis of the symbol boundaries,
wherein an extraction window for extracting the block of sample data is determined on the basis of the location of the detected primary synchronization signal in the stream of sample data and a predefined offset.

18. The receiver of claim 11, further comprising:
a controller block coupled to at least the coarse correlator block and the fine correlator block and arranged to control the blocks according to the method of claim 1.

19. The receiver of claim 11, further comprising:
wherein the receiver is an orthogonal frequency division multiplexing receiver,
wherein the receiver is capable of cellular communication according to at least one of the Long Time Evolution, LTE, standard and Long Time Evolution Advanced, LTE-A, standard,
wherein the synchronization symbols received from the plurality of wireless communication cells are Second Synchronization Signal, SSS, symbols,
wherein the reference sequences represent Second Synchronization Signal, SSS, symbols in frequency domain.

20. A non-transitory, tangible computer readable storage medium bearing computer executable instructions for operating a multicarrier communication receiver, wherein the instructions, when executing on one or more processing devices, cause the one or more processing devices to perform a method comprising: retrieving sample data transformed in frequency domain from a buffer of the receiver, wherein the sample data comprises synchronization symbols each received from one of a plurality of wireless communication cells; estimating a coarse time offset value for one of the by plurality of wireless communication cells by providing a first set of phase-rotated reference sequences, which are based on a set of different reference sequences and a first set of rotation phase values, determining first correlation metric values by applying a partial correlation comprising part-wise correlating the sample data with each one of the first set of phase-rotated reference sequences and non-coherent combining the correlation metric values of the parts for each one of the first set of phase-rotated reference sequences, and determining a first maximum value of the first correlation metric values, wherein the first maximum value yields to a cell identifier value; estimating a fine time offset value for the one wireless communication cell by providing a second set of phase-rotated reference sequences, which are based on a reference sequence associated with the cell identifier value and a second set of rotation phase values, determining second correlation metric values by applying a correlation comprising correlating the sample data with each one of the second set of phase-rotated reference sequences, and determining a second maximum value of the second correlation metric values, wherein the second maximum value yields to a fine time offset; regenerating a synchronization symbol corresponding to the phase-rotated synchronization reference symbol based on the cell identifier value and the fine time offset; and cancelling the regenerated synchronization symbol from the sample data in the buffer.

* * * * *